United States Patent
Kitahara et al.

(10) Patent No.: US 9,264,648 B2
(45) Date of Patent: Feb. 16, 2016

(54) RECEIVING DEVICE, RECEIVING METHOD, TRANSMITTING DEVICE, AND TRANSMITTING METHOD

(71) Applicant: Sony Corporation, Tokyo (JP)

(72) Inventors: Jun Kitahara, Saitama (JP); Naohisa Kitazato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 13/888,865

(22) Filed: May 7, 2013

(65) Prior Publication Data

US 2014/0099078 A1    Apr. 10, 2014

Related U.S. Application Data

(60) Provisional application No. 61/711,526, filed on Oct. 9, 2012.

(51) Int. Cl.
| | |
|---|---|
| *H04N 5/92* | (2006.01) |
| *H04N 5/76* | (2006.01) |
| *H04N 9/82* | (2006.01) |
| *H04N 21/462* | (2011.01) |
| *H04N 21/81* | (2011.01) |
| *H04H 20/40* | (2008.01) |
| *H04N 21/4722* | (2011.01) |
| *H04N 21/658* | (2011.01) |

(Continued)

(52) U.S. Cl.
CPC .................. *H04N 5/76* (2013.01); *H04H 20/40* (2013.01); *H04H 20/91* (2013.01); *H04H 60/72* (2013.01); *H04N 9/8205* (2013.01); *H04N 21/4622* (2013.01); *H04N 21/4722* (2013.01); *H04N 21/6581* (2013.01); *H04N 21/8173* (2013.01); *H04N 5/765* (2013.01); *H04N 5/782* (2013.01)

(58) Field of Classification Search
CPC ..................... G11B 27/105; G11B 2220/2562; G11B 27/329; H04N 5/85; H04N 9/8042
USPC .................................................. 386/240, 248
See application file for complete search history.

(56) References Cited

U.S. PATENT DOCUMENTS

2006/0253874 A1* 11/2006 Stark et al. ....................... 725/62
2007/0220577 A1*  9/2007 Kongalath ....................... 725/131

(Continued)

FOREIGN PATENT DOCUMENTS

JP      2011-041242          2/2011
WO   WO 2012/029584 A1   3/2012

OTHER PUBLICATIONS

ATSC Candidate Standard Non-Real Time Content Delivery Dec. 2010.*

(Continued)

*Primary Examiner* — William Tran
(74) *Attorney, Agent, or Firm* — Oblon, McClelland, Maier & Neustadt, L.L.P.

(57) ABSTRACT

Disclosed herein is a receiving device including: a first receiving section configured to receive audio visual contents capable of a download reservation and transmitted in non-real time; a recording section configured to record the audio visual contents that have been downloaded; an obtaining section configured to obtain an application program for executing a process related to the audio visual contents; and an executing section configured to execute the process related to the audio visual contents on a basis of control information included in the application program.

21 Claims, 24 Drawing Sheets

(51) Int. Cl.
  *H04H 20/91* (2008.01)
  *H04H 60/72* (2008.01)
  *H04N 5/765* (2006.01)
  *H04N 5/782* (2006.01)

(56) References Cited

U.S. PATENT DOCUMENTS

| | | | |
|---|---|---|---|
| 2010/0251310 A1* | 9/2010 | Hirota et al. | 725/59 |
| 2011/0075990 A1 | 3/2011 | Eyer | |
| 2011/0088075 A1 | 4/2011 | Eyer | |
| 2011/0243536 A1 | 10/2011 | Eyer | |
| 2011/0246488 A1 | 10/2011 | Eyer | |
| 2011/0247028 A1 | 10/2011 | Eyer | |
| 2011/0298981 A1 | 12/2011 | Eyer | |
| 2011/0299827 A1 | 12/2011 | Eyer | |
| 2011/0302599 A1 | 12/2011 | Eyer | |
| 2011/0302611 A1 | 12/2011 | Eyer | |
| 2011/0307920 A1 | 12/2011 | Blanchard et al. | |
| 2012/0044418 A1 | 2/2012 | Eyer | |
| 2012/0047531 A1 | 2/2012 | Eyer | |
| 2012/0050619 A1 | 3/2012 | Kitazato et al. | |
| 2012/0050620 A1 | 3/2012 | Kitazato | |
| 2012/0054214 A1 | 3/2012 | Yamagishi et al. | |
| 2012/0054235 A1 | 3/2012 | Kitazato et al. | |
| 2012/0054267 A1 | 3/2012 | Yamagishi et al. | |
| 2012/0054268 A1 | 3/2012 | Yamagishi | |
| 2012/0054783 A1 | 3/2012 | Yamagishi | |
| 2012/0054784 A1 | 3/2012 | Kitazato et al. | |
| 2012/0054816 A1* | 3/2012 | Dewa | 725/116 |
| 2012/0060197 A1 | 3/2012 | Kitahara et al. | |
| 2012/0063508 A1 | 3/2012 | Hattori et al. | |
| 2012/0072965 A1 | 3/2012 | Dewa | |
| 2012/0081508 A1 | 4/2012 | Kitazato | |
| 2012/0081607 A1 | 4/2012 | Kitazato | |
| 2012/0082266 A1 | 4/2012 | Kitazato et al. | |
| 2012/0082440 A1 | 4/2012 | Kitazato | |
| 2012/0084802 A1 | 4/2012 | Kitazato | |
| 2012/0084824 A1 | 4/2012 | Kitazato | |
| 2012/0084829 A1 | 4/2012 | Kitazato | |
| 2012/0185888 A1 | 7/2012 | Eyer et al. | |
| 2012/0253826 A1 | 10/2012 | Kitazato et al. | |
| 2012/0274848 A1 | 11/2012 | Kitahara et al. | |
| 2012/0275764 A1 | 11/2012 | Eyer | |
| 2013/0024894 A1 | 1/2013 | Eyer | |
| 2013/0024897 A1 | 1/2013 | Eyer | |
| 2013/0031569 A1 | 1/2013 | Kitazato et al. | |
| 2013/0036440 A1 | 2/2013 | Eyer | |
| 2013/0055313 A1 | 2/2013 | Eyer | |
| 2013/0103716 A1 | 4/2013 | Yamagishi | |
| 2013/0133014 A1* | 5/2013 | Kim | 725/86 |

OTHER PUBLICATIONS

International Search Report issued Jan. 7, 2014 in PCT/JP2013/076484 (with English language translation).

* cited by examiner

FIG. 8

| Event ID | Description |
|---|---|
| A | User tunes a receiver to broadcast program of a liner TV channel. |
| B | User selects the EPG button of remote controller and then displayed EPG by native application. |
| C | User tunes a receiver to broadcast program of a NRT channel with service category "portal". |
| D | User tunes a receiver to broadcast program of a NRT channel with service category "scripted". |
| E | User selects the NRT button of remote controller and then user interface displays NRT content portal by native application. |

FIG. 9

| UI | Title | Expected next event |
|---|---|---|
| 1 | Watch broadcast program | a. Launch the TDO by receiving trigger while watching broadcast program. |
| 2 | Broadcast and TDO | b. TDO is updated when receiver receives new TDO and its trigger.<br>c. User selects the NRT content to begin playback.<br>e. User interface transits to "Browser PDO content" automatically. |
| 3 | EPG | f. User clicks a title where user wants to see the detail information, and then advanced EPG is displayed. |
| 4 | Advanced EPG | Deleted |
| 5 | Browse NDO content Advanced EPG | g. User selects PDO content.<br>m. User selects to begin playback NRT audio /video content.<br>n. User selects to reserve NRT content download or subscription of Push NRT service. |
| 6 | NRT content portal | j. User selects NDO content when watching NRT Content portal.<br>k. User selects to reserve NRT content download or Push NRT service subscription.<br>l. User selects to begin playback NRT audio /video content. |
| 7 | Playback NRT audio /video content | c. Native application transits to broadcast program and TDO when user selects to stop playback of the NRT content.<br>l. User selects to stop playback.<br>m. User selects to stop playback. |
| 8 | Reserve NRT content download | d, k, n<br>This state indicates internal function to download the NRT content in background when user selects to reserve it. |
| 9 | Subscribe push NRT service | d, k, n<br>This state indicates internal function to subscribe the Push NRT service in background when user selects to reserve it. |
| 10 | Playback NRT content and TDO | Deleted |
| 11 | Browse PDO Content | h. User selects to watch other PDO content.<br>i. User selects to watch general internet content. |
| 12 | Browse internet content | out of scope |

FIG.10 reserveNRTContentDownload

DESCRIPTION : FUNCTION FOR RESERVING DOWNLOAD OF NRT CONTENTS

ARGUMENT : Content linkage

RETURN VALUE : true, false, COMPLETION OF TENTATIVE RESERVATION

FIG.11 cancelNRTContentDownloadReservation

DESCRIPTION : FUNCTION FOR CANCELLING RESERVATION FOR DOWNLOAD OF NRT CONTENTS

ARGUMENT : Content linkage

RETURN VALUE : true, false

FIG.12 getNRTContentDownloadStatus

DESCRIPTION : FUNCTION FOR OBTAINING STATE OF DOWNLOAD OF NRT CONTENTS WHOSE DOWNLOAD IS RESERVED

ARGUMENT : Content linkage

RETURN VALUE : status (YET TO BE STARTED, BEING PERFORMED, COMPLETED)

FIG.13 executeNRTContentDownload

DESCRIPTION : FUNCTION FOR IMMEDIATELY DOWNLOADING NRT CONTENTS

ARGUMENT : Content linkage

RETURN VALUE : true, false

FIG. 14 cancelNRTContentDownload

DESCRIPTION : FUNCTION FOR STOPPING OR ENDING DOWNLOAD OF NRT CONTENTS WHICH DOWNLOAD IS BEING PERFORMED

ARGUMENT : Content linkage

RETURN VALUE : true, false

FIG. 15 deleteNRTContent

DESCRIPTION : FUNCTION FOR DELETING DOWNLOADED NRT CONTENTS AND RELATED INFORMATION RELATED TO DOWNLOADED NRT CONTENTS

ARGUMENT : Content linkage

RETURN VALUE : true, false

FIG.16 getNRTContentInformation

DESCRIPTION : FUNCTION FOR OBTAINING DETAILED INFORMATION ON DOWNLOADED NRT CONTENTS

ARGUMENT : Content linkage

RETURN VALUE : Content info

FIG.17 getCurrentNRTIT

DESCRIPTION : FUNCTION FOR OBTAINING LATEST NRT-IT CURRENTLY TRANSMITTED BY BROADCAST WAVES

RETURN VALUE : true, false

FIG.18 getStorageInfo

DESCRIPTION : FUNCTION FOR OBTAINING TOTAL SPACE AND
AVAILABLE SPACE OF RECORDING SECTION

RETURN VALUE : storage info

FIG.19

```
<html>
<head>
<title>page title</title>
<meta http-equiv="Content-Script-Type" content="text/javascript">
</head>
<body>
<SCRIPT LANGUAGE="JavaScript">
<!--
var storage = { "total_size" : "0", "used_size" : "0" };
result = storage.getStorageInfo();   // OBTAIN RECORDING SPACE INFORMATION
document.write( storage );           // DISPLAY RECORDING SPACE INFORMATION
//-->
</SCRIPT>
</body>
</html>
```

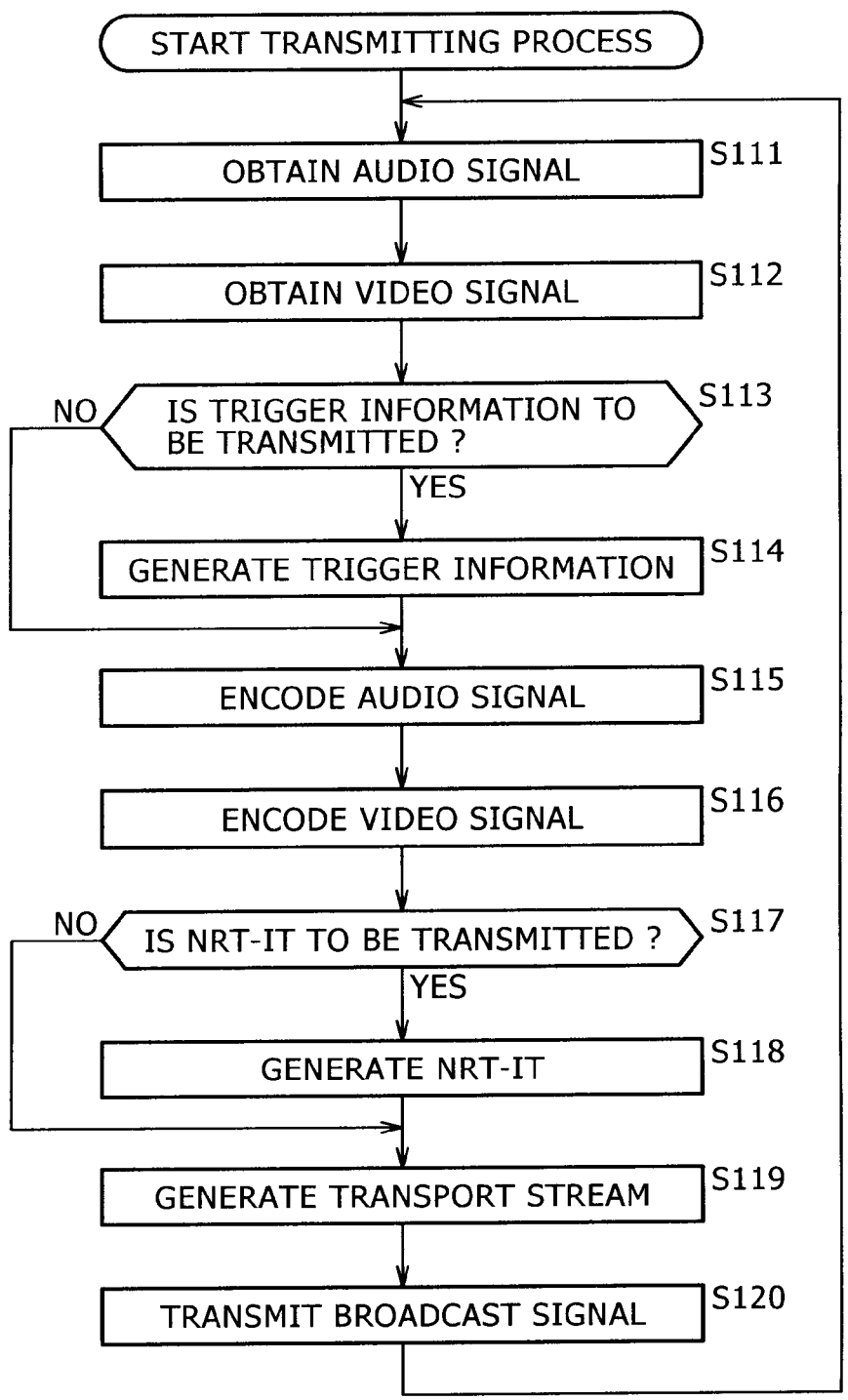

RECEIVING DEVICE, RECEIVING METHOD, TRANSMITTING DEVICE, AND TRANSMITTING METHOD

CROSS-REFERENCE TO RELATED APPLICATION

This application claims the benefit of priority of Provisional Application Ser. No. 61/711,526, filed on Oct. 9, 2012, the entire content of which is incorporated herein by reference.

BACKGROUND

The present technology relates to a receiving device, a receiving method, a transmitting device, and a transmitting method, and particularly to a receiving device, a receiving method, a transmitting device, and a transmitting method that can provide a common control system for executing processes related to NRT (Non Real Time) contents.

ATSC (Advanced Television Systems Committee) is used as a standard for digital television broadcasting in North America, Mexico, South Korea, and the like. A BML (Broadcast Markup Language) document described in BML is used in data broadcasting operated in digital television broadcasting in Japan. ATSC2.0, which is a next-generation standard of ATSC, is set to use HTML documents described in HTML (Hyper Text Markup Language).

Application programs described in the HTML documents are not only provided by a broadcaster but also provided by other entities than the broadcaster, such as a content production company and various kinds of providers, for example.

In addition, multiple channels or high-definition television broadcasts are generally received in digital television broadcasting. Meanwhile, technology consideration and system development are under way to enable more advanced broadcasting service desired by users in addition to ordinary television broadcasting using an available band in digital television broadcasting.

Functions desired by users include on-demand viewing, which allows a user to view AV (Audio Visual) contents such as a television program or the like when the user desires to view the AV contents. However, it has been considered to be difficult to realize the on-demand viewing in broadcasting of unidirectional transmission rather than bidirectional transmission.

Accordingly, providing an NRT (Non Real Time) broadcasting service for once recording and then reproducing AV contents transmitted by broadcast waves on an assumption that a receiving device has a mass storage has been considered in order to enable on-demand viewing in broadcasting of unidirectional transmission (see Japanese Patent Laid-Open No. 2011-41242, for example). Incidentally, in the following description, AV contents provided by the NRT service will be referred to as NRT contents.

SUMMARY

An application program composed of an HTML document used in compliance with ATSC2.0 operates on a browser started by a receiving device. Functions for executing processes related to NRT contents are scheduled to be provided as functions thereof.

However, when application programs are provided by a plurality of entities other than the broadcaster, HTML documents are created for each of the entities. There is thus a desire to provide a common control system for executing processes related to NRT contents.

The present technology has been made in view of such a situation, and is to make it possible to provide a common control system for executing processes related to NRT contents.

A receiving device according to a first aspect of the present technology includes: a first receiving section configured to receive AV contents capable of a download reservation and transmitted in non-real time; a recording section configured to record the AV contents that have been downloaded; an obtaining section configured to obtain an application program for executing a process related to the AV contents; and an executing section configured to execute the process related to the AV contents on a basis of control information included in the application program.

When a predetermined event has occurred during execution of the application program, the executing section executes the process related to the AV contents according to the event that has occurred.

The control information is a function for reserving a download of the AV contents, and when the AV contents whose download is to be reserved are specified, the executing section reserves a download of the specified AV contents.

The control information is a function for cancelling a reservation for a download of the AV contents, and when the AV contents to be cancelled are specified, the executing section cancels the reservation for a download of the specified AV contents.

The control information is a function for obtaining a download state of the AV contents whose download is reserved, and when an instruction to obtain the download state is given, the executing section obtains the download state.

The control information is a function for obtaining detailed information on the downloaded AV contents, and when an instruction to obtain the detailed information is given, the executing section obtains the detailed information.

The control information is a function for performing an immediate download of the AV contents, and when the immediate download of the AV contents whose download is to be reserved is specified, the executing section performs the specified immediate download of the AV contents.

The control information is a function for stopping a download of the AV contents, and when an instruction to stop the download of the AV contents is given, the executing section stops the download of the AV contents.

The control information is a function for deleting the downloaded AV contents and related information related to the AV contents, and when the AV contents to be deleted are specified, the executing section deletes the specified AV contents and the related information.

The control information is a function for updating download information on a download of the AV contents, the download information being transmitted periodically together with the AV contents, and when an instruction to update the download information is given, the executing section obtains and updates the download information.

The control information is a function for obtaining recording space information on a recording space of the recording section, and when an instruction to obtain the recording space information is given, the executing section obtains the recording space information.

The application program is an HTML document described in HTML (Hyper Text Markup Language), and the control information is a function described as a script in the HTML document.

The obtaining section obtains the HTML document transmitted from an information processing device managed by another entity than an entity providing the AV contents.

The first receiving section receives the AV contents transmitted by broadcast waves.

A second receiving section configured to receive the AV contents distributed via the Internet when the AV contents transmitted by the broadcast waves cannot be received is further provided.

The executing section identifies the target AV contents by identifying information identifying the AV contents, the identifying information being included in download information on a download of the AV contents, the download information being transmitted periodically together with the AV contents.

The download information is an NRT-IT (Non Real Time Information Table), and the identifying information is a Content Linkage included in the NRT-IT.

The receiving device may be an independent device, or may be an internal block forming one device.

A receiving method according to the first aspect of the present technology is a receiving method corresponding to the receiving device according to the first aspect of the present technology.

In the receiving device and the receiving method according to the first aspect of the present technology, AV contents capable of a download reservation and transmitted in non-real time are received, recording of the AV contents that have been downloaded in a recording section is controlled, an application program for executing a process related to the AV contents is obtained, and the process related to the AV contents is executed on a basis of control information included in the application program.

A transmitting device according to a second aspect of the present technology includes: a generating section configured to generate an application program including control information for executing a process related to AV contents capable of a download reservation and transmitted in non-real time; and a transmitting section configured to transmit the application program.

The transmitting device may be an independent device, or may be an internal block forming one device.

A transmitting method according to the second aspect of the present technology is a transmitting method corresponding to the transmitting device according to the second aspect of the present technology.

In the transmitting device and the transmitting method according to the second aspect of the present technology, an application program including control information for executing a process related to AV contents capable of a download reservation and transmitted in non-real time is generated, and the application program is transmitted.

According to the first aspect and the second aspect of the present technology, a common control system for executing processes related to NRT contents can be provided.

BRIEF DESCRIPTION OF THE DRAWINGS

FIG. 8 is a diagram showing details of events;

FIG. 9 is a diagram showing relation between screen transitions and events;

FIG. 10 is a diagram of assistance in explaining a reserveNRTContentDownload function;

FIG. 11 is a diagram of assistance in explaining a cancelNRTContentDownloadReservation function;

FIG. 12 is a diagram of assistance in explaining a getNRTContentDownloadStatus function;

FIG. 13 is a diagram of assistance in explaining an executeNRTContentDownload function;

FIG. 14 is a diagram of assistance in explaining a cancelNRTContentDownload function;

FIG. 15 is a diagram of assistance in explaining a deleteNRTContent function;

FIG. 16 is a diagram of a getNRTContentInformation function;

FIG. 17 is a diagram of assistance in explaining a getCurrentNRTIT function;

FIG. 18 is a diagram of assistance in explaining a getStorageInfo function;

FIG. 19 is a diagram showing an example of description of a script;

FIG. 20 is a flowchart of assistance in explaining a transmitting process;

DETAILED DESCRIPTION OF THE PREFERRED EMBODIMENT

An embodiment of the present technology will hereinafter be described with reference to the drawings.

<Example of Configuration of Broadcasting-Communication Cooperation System>

Figure 1:
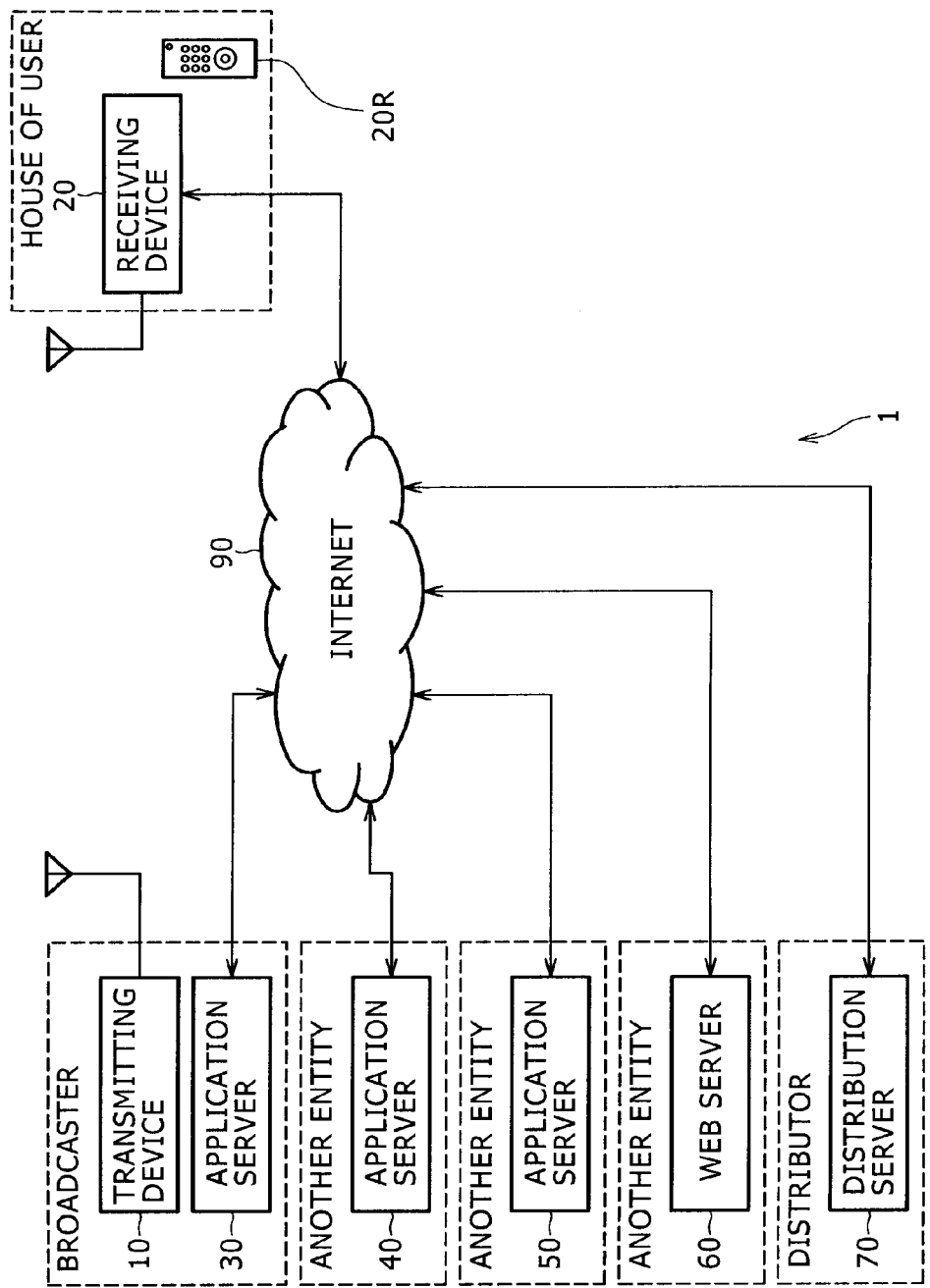
FIG. 1 is a diagram showing an example of configuration of a broadcasting-communication cooperation system.

FIG. 1 shows an example of configuration of a broadcasting-communication cooperation system 1. This broadcasting-communication cooperation system 1 includes a transmitting device 10, a receiving device 20, an application server 30, an application server 40, an application server 50, a Web server 60, and a distribution server 70.

The receiving device 20, the application server 30, the application server 40, the application server 50, the Web server 60, and the distribution server 70 are interconnected via the Internet 90.

The transmitting device 10 transmits (broadcasts) broadcast contents such as a television program, a commercial, or the like by a digital television broadcast signal (hereinafter referred to simply as a broadcast signal). The broadcast signal is transmitted as a normal broadcast or an NRT broadcast.

In this case, the normal broadcast refers to a broadcast assuming real-time viewing on the receiving device 20 receiving the broadcast signal. The NRT (Non Real Time) broadcast refers to a broadcast not assuming real-time viewing, and transmits the data of NRT contents by a broadcast signal. Incidentally, in the NRT broadcast, NRT contents are transmitted using a FLUTE (File Delivery over Unidirectional Transport) session. Details of FLUTE are defined as RFC3926.

In addition, the transmitting device 10 periodically transmits an NRT-IT (Non Real Time Information Table) together with the broadcast contents.

In addition, the transmitting device 10 transmits trigger information in a state of being included in the broadcast signal. The trigger information in this case is information for controlling the operation of an application program executed so as to be operatively associated with the broadcast contents. The application program executed according to the trigger information will hereinafter be referred to as a TDO (Triggered Declarative Object) application.

Incidentally, the transmitting device 10 is managed by a broadcaster.

The receiving device 20 is a receiver such as a television receiver or the like. The receiving device 20 receives the broadcast signal transmitted from the transmitting device 10, and thereby obtains the video and audio of the broadcast contents. The receiving device 20 displays the video of the broadcast contents on a display, and outputs the audio of the broadcast contents from a speaker.

In addition, when the receiving device 20 reserved a download of NRT contents on the basis of the NRT-IT from the transmitting device 10, the receiving device 20 starts to receive the broadcast signal of the NRT broadcast at a time of a start of broadcasting of the target NRT contents. The receiving device 20 records the data of the NRT contents obtained from the broadcast signal in a recording section (storage). In addition, when an instruction to view the NRT contents is given, the receiving device 20 reads and reproduces the NRT contents recorded in the recording section.

Incidentally, the receiving device 20 can be remotely controlled by using a remote control 20R. In addition, the receiving device 20 is installed in the house of a user.

The application server 30 manages a TDO application composed of an HTML document for data broadcasting. The HTML document for data broadcasting in this case refers to an HTML document executed to realize service for data broadcasting.

The application server 30 provides the TDO application in response to a request from the receiving device 20 that has accessed the application server 30 via the Internet 90. The application server 30 is managed by the broadcaster.

The application server 40 manages an NDO application composed of an HTML document for data broadcasting. The NDO (NRT Declarative Object) application in this case is an application program for providing a process related to NRT contents. However, unlike the TDO application, the NDO application is not executed according to trigger information.

The application server 40 provides the NDO application in response to a request from the receiving device 20 that has accessed the application server 40 via the Internet 90. The application server 40 is managed by another entity than the broadcaster.

The application server 50 manages a PDO application composed of an HTML document for data broadcasting. The PDO (Plain Declarative Object) application in this case is an application program executable only by a particular browser.

The application server 50 provides the PDO application in response to a request from the receiving device 20 that has accessed the application server 50 via the Internet 90. The application server 50 is managed by another entity than the broadcaster.

Incidentally, details of the TDO application, the NDO application, and the PDO application will be described later. These application programs can also be transmitted by broadcast waves using a FLUTE session.

The Web server 60 manages a Web page composed of an HTML document for a homepage. The HTML document for the homepage in this case refers to an HTML document for presenting the Web page.

The Web server 60 provides the Web page in response to a request from the receiving device 20 that has accessed the Web server 60 via the Internet 90. The Web server 60 is managed by another entity than the broadcaster.

The receiving device 20 obtains the TDO application from the application server 30 according to the trigger information from the transmitting device 10, and controls the operation thereof.

In addition, the receiving device 20 accesses the application server 40 via the Internet 90, obtains the NDO application, and executes the NDO application. Further, the receiving device 20 accesses the application server 50 via the Internet 90, obtains the PDO application, and executes the PDO application.

As a result of these, the receiving device 20 displays video generated by superimposing the video of the HTML document for data broadcasting on the video of the broadcast contents.

In addition, the receiving device 20 accesses the Web server 60 via the Internet 90, obtains the Web page, and executes the Web page. The receiving device 20 thereby displays the video of the HTML document for the homepage.

The distribution server 70 stores NRT contents such as a television program or the like distributable on a VOD (Video On Demand) basis via the Internet 90. The distribution server 70 distributes the NRT contents via the Internet in response to a request from the receiving device 20. Incidentally, the distribution server 70 is managed by a distributor that is the same as or different from the broadcaster.

The receiving device 20 obtains the video and audio of the NRT contents distributed from the distribution server 70. The receiving device 20 displays the video of the NRT contents on the display, and outputs the audio of the NRT contents from the speaker.

Incidentally, while FIG. 1 shows only one receiving device 20 for the simplicity of description, the broadcasting-communication cooperation system 1 actually includes a plurality of receiving devices 20, and these receiving devices 20 receive the broadcast contents from the transmitting device 10 or the communication contents from the distribution server 70.

Similarly, while FIG. 1 shows one transmitting device 10 and one application server 30, a plurality of transmitting devices 10 and a plurality of application servers 30 are actually provided for each broadcaster. In addition, a plurality of application servers 40, a plurality of application servers 50, a plurality of Web servers 60, and a plurality of distribution servers 70 are actually provided for each entity.

The broadcasting-communication cooperation system 1 is configured as described above.

<Example of Configuration of Transmitting Device>

Figure 2:
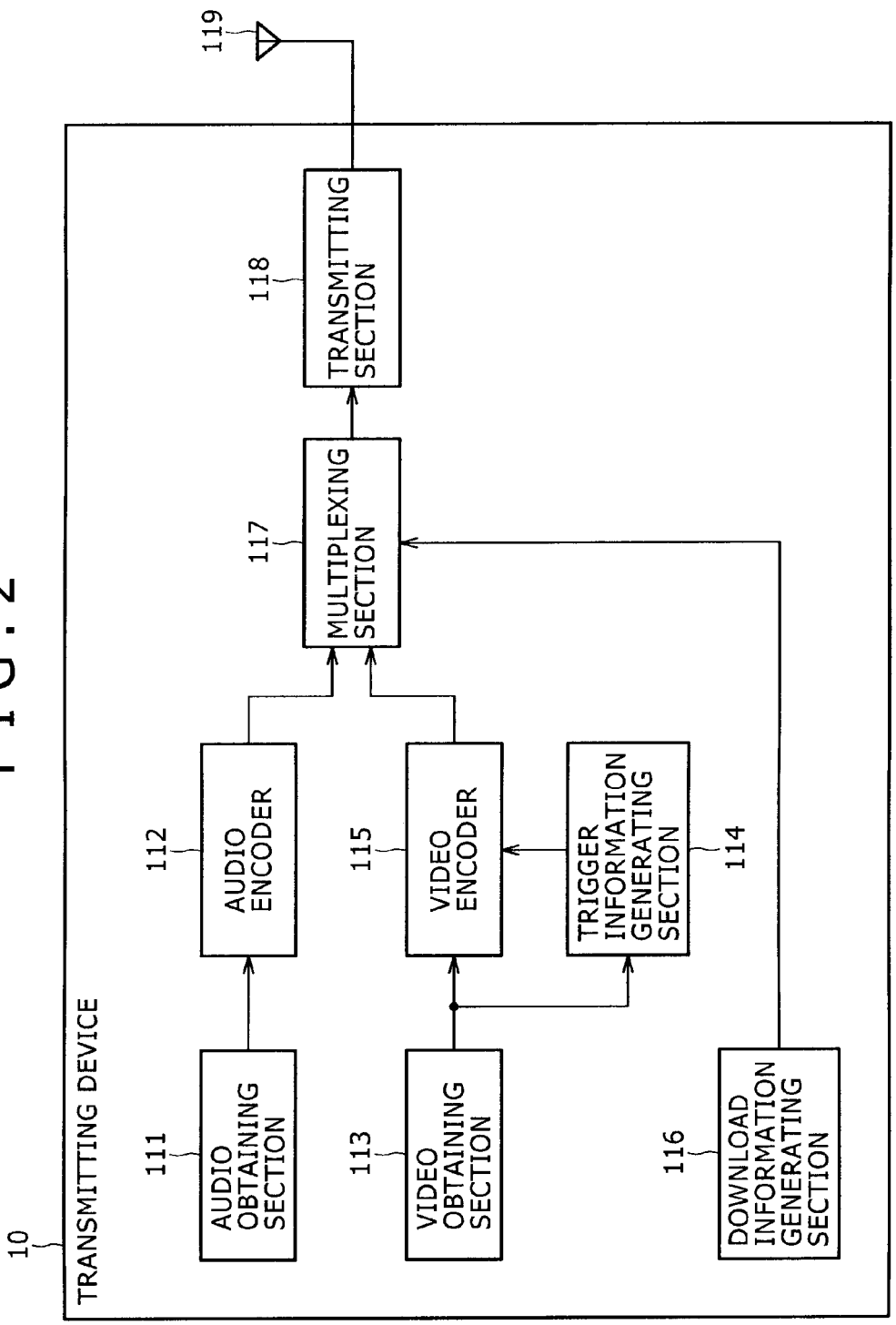
FIG. 2 is a diagram showing an example of configuration of a transmitting device.

FIG. 2 shows an example of configuration of the transmitting device 10 in FIG. 1.

As shown in FIG. 2, the transmitting device 10 includes an audio obtaining section 111, an audio encoder 112, a video obtaining section 113, a trigger information generating section 114, a video encoder 115, a download information generating section 116, a multiplexing section 117, and a transmitting section 118.

The audio obtaining section 111 obtains the audio signal of broadcast contents from an external server, a microphone, a recording medium, or the like, and supplies the audio signal to the audio encoder 112.

The audio encoder 112 encodes the audio signal supplied from the audio obtaining section 111 in conformity to an encoding system such as MPEG (Moving Picture Experts Group) 2 or the like, and supplies a resulting audio stream to the multiplexing section 117.

The video obtaining section 113 obtains the video signal of the broadcast contents from the external server, a camera, the recording medium, or the like, and supplies the video signal to the trigger information generating section 114 and the video encoder 115.

The trigger information generating section 114 generates trigger information, and supplies the trigger information to the video encoder 115. For example, the trigger information is generated according to the progress of the broadcast contents corresponding to the video signal supplied from the video obtaining section 113.

The video encoder 115 encodes the video signal supplied from the video obtaining section 113 in conformity to the encoding system such as MPEG2 or the like. In addition, the video encoder 115 arranges the trigger information within a video stream obtained by the encoding. For example, the trigger information is arranged within caption data in the user data area of the video stream.

The video stream including the trigger information is supplied to the multiplexing section 117.

The download information generating section 116 periodically generates an NRT-IT on the basis of information on NRT contents, and supplies the NRT-IT to the multiplexing section 117. Incidentally, details of the NRT-IT will be described later with reference to FIG. 21.

The multiplexing section 117 is supplied with the audio stream from the audio encoder 112, the video stream from the video encoder 115, and the NRT-IT from the download information generating section 116. The multiplexing section 117 multiplexes the audio stream, the video stream, and the NRT-IT, and supplies a resulting transport stream to the transmitting section 118.

The transmitting section 118 transmits the transport stream supplied from the multiplexing section 117 as a broadcast signal via an antenna 119.

However, as described above, the transmitting device 10 performs the normal broadcast and the NRT broadcast. The above description with reference to FIG. 2 is description in the case of the normal broadcast. In the case of the NRT broadcast, on the other hand, unlike a reservation for recording broadcast contents such as a television program or the like, NRT contents are transmitted in a time period of a wide transmission band of the broadcast signal broadcast by broadcast waves, for example, and therefore the transmitting device 10 transmits the NRT contents using a FLUTE session according to a predetermined distribution schedule. In addition, when transmitting an application program such as the NDO application or the like by broadcast waves, the transmitting device 10 generates the application program, and transmits the application program using a FLUTE session.

The transmitting device 10 is configured as described above.

<Example of Configuration of Receiving Device>

Figure 3:
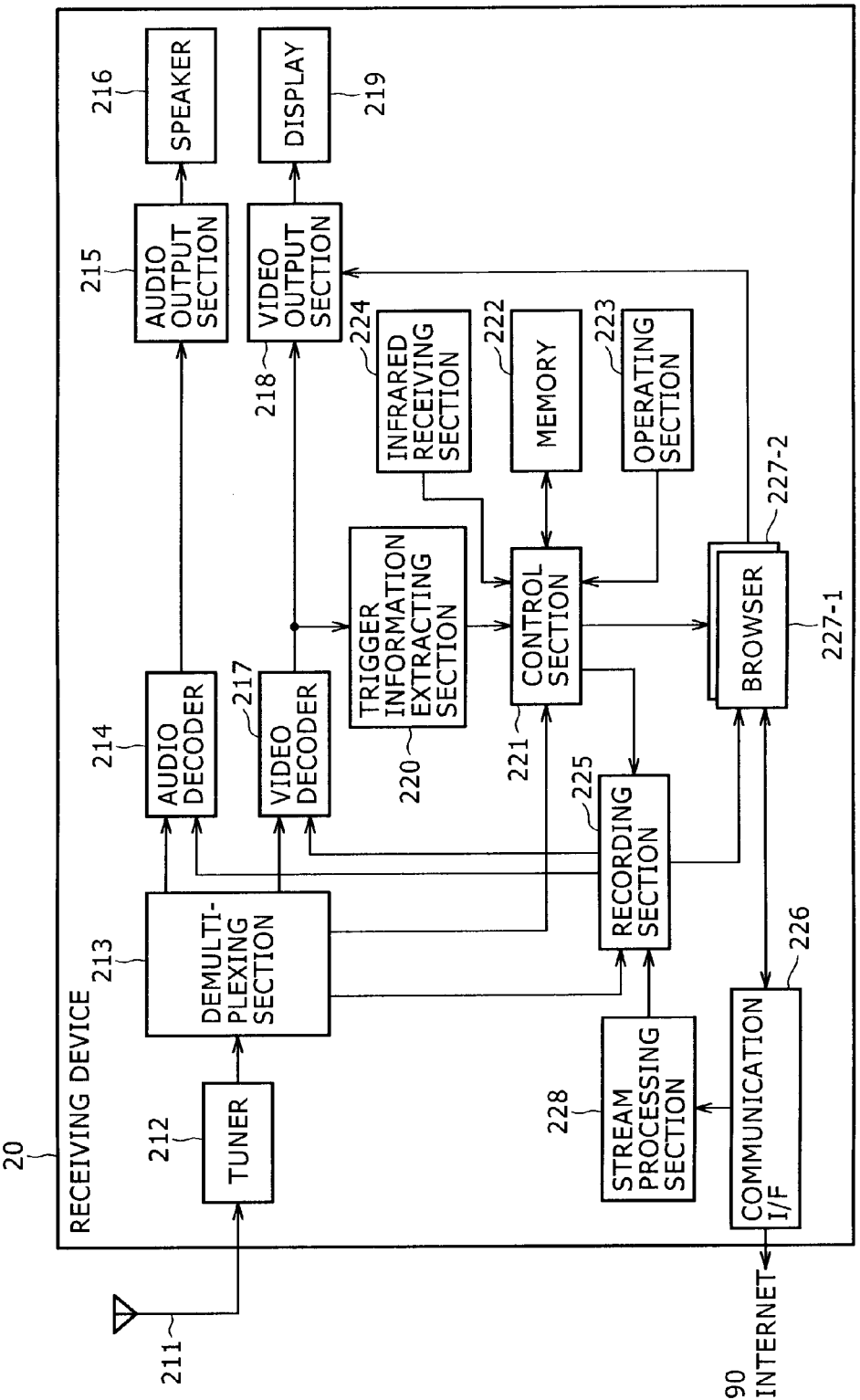
FIG. 3 is a diagram showing an example of configuration of a receiving device.

FIG. 3 shows an example of configuration of the receiving device 20 in FIG. 1.

As shown in FIG. 3, the receiving device 20 includes a tuner 212, a demultiplexing section 213, an audio decoder 214, an audio output section 215, a speaker 216, a video decoder 217, a video output section 218, a display 219, a trigger information extracting section 220, a control section 221, a memory 222, an operating section 223, an infrared receiving section 224, a recording section 225, a communication I/F 226, a browser 227-1, a browser 227-2, and a stream processing section 228.

The tuner 212 demodulates a broadcast signal received via an antenna 211, and supplies a resulting transport stream to the demultiplexing section 213.

When the broadcast signal of the normal broadcast is received, the demultiplexing section 213 separates the transport stream supplied from the tuner 212 into an audio stream and a video stream, and supplies the audio stream and the video stream to the audio decoder 214 and the video decoder 217, respectively. In addition, when the broadcast signal of the NRT broadcast is received, the demultiplexing section 213 supplies the separated audio stream and the separated video signal to the recording section 225. Further, when an application program such as the NDO application or the like is transmitted by broadcast waves, the demultiplexing section 213 obtains the application program, and supplies the application program to the recording section 225.

Incidentally, when an NRT-IT is separated from the transport stream, the demultiplexing section 213 supplies the NRT-IT to the control section 221.

The audio decoder 214 decodes the audio stream supplied from the demultiplexing section 213 by a decoding system corresponding to the encoding system of the audio encoder 112 (FIG. 2) such as MPEG2 or the like, and supplies a resulting audio signal to the audio output section 215.

The audio output section 215 supplies the audio signal supplied from the audio decoder 214 to the speaker 216. The speaker 216 outputs audio corresponding to the audio signal supplied from the audio output section 215.

The video decoder 217 decodes the video stream supplied from the demultiplexing section 213 by a decoding system corresponding to the encoding system of the video encoder 115 (FIG. 2) such as MPEG2 or the like, and supplies a resulting video signal to the video output section 218 and the trigger information extracting section 220.

The video output section 218 supplies the video signal supplied from the video decoder 217 to the display 219. The display 219 displays video corresponding to the video signal supplied from the video output section 218.

The trigger information extracting section 220 monitors the video stream decoded by the video decoder 217 at all times, extracts trigger information, and supplies the trigger information to the control section 221.

The control section 221 controls the operation of each part of the receiving device 20 by executing a control program recorded in the memory 222 in advance. In addition, when an NRT-IT is supplied from the demultiplexing section 213, the control section 221 records the NRT-IT in the memory 222. Incidentally, various kinds of information are recorded in the memory 222.

The operating section 223 receives various kinds of operation from a user, and notifies operating signals corresponding to the various kinds of operation to the control section 221. The infrared receiving section 224 receives an operating signal transmitted by using wireless communication by infrared rays from the remote control 20R (FIG. 1), and notifies the operating signal to the control section 221. The control section 221 controls the operation of each part of the receiving device 20 on the basis of the operating signal supplied from the operating section 223 or the infrared receiving section 224.

The recording section 225 is formed by a mass storage such as an HDD (Hard Disk Drive) or the like.

When the broadcast signal of the NRT broadcast is received, the recording section 225 is supplied with the audio stream and the video stream from the demultiplexing section 213. The recording section 225 records therein the data of the audio stream and the video stream from the demultiplexing section 213 under control from the control section 221. NRT contents and related information related to the NRT contents are thereby recorded in the recording section 225.

In addition, when an application program such as the NDO application or the like is transmitted by broadcast waves using a FLUTE session, the recording section 225 supplies the application program input from the demultiplexing section 213 to the browser 227-1 or the browser 227-2.

When the control section 221 is supplied with trigger information from the trigger information extracting section 220, the control section 221 controls the browser 227-1, and controls the operation of the TDO application.

In addition, the control section 221 controls the browser 227-1, and controls the operation of the NDO application. Further, the control section 221 controls the browser 227-2, and controls the operation of the PDO application.

The communication I/F 226 accesses the application server 30 via the Internet 90 to receive the TDO application under control from the browser 227-1. The communication I/F 226 supplies the TDO application to the browser 227-1.

The browser 227-1 controls the operation of the TDO application from the recording section 225 or the communication I/F 226 under control from the control section 221. The browser 227-1 generates a video signal for data broadcasting by executing the TDO application, and supplies the video signal to the video output section 218.

In addition, the communication I/F 226 accesses the application server 40 via the Internet 90 to receive the NDO application under control from the browser 227-1. The communication I/F 226 supplies the NDO application to the browser 227-1.

The browser 227-1 generates a video signal for data broadcasting by executing the NDO application from the recording section 225 or the communication I/F 226, and supplies the video signal to the video output section 218, under control from the control section 221.

In addition, the communication I/F 226 accesses the Web server 60 via the Internet 90 to receive a Web page under control from the browser 227-1. The communication I/F 226 supplies the Web page to the browser 227-1.

The browser 227-1 generates a video signal representing a homepage or the like by executing the Web page from the communication I/F 226, and supplies the video signal to the video output section 218, under control from the control section 221.

Incidentally, a detailed configuration of the browser 227-1 will be described later with reference to FIG. 4.

The communication I/F 226 accesses the application server 50 via the Internet 90 to receive the PDO application under control from the browser 227-2. The communication I/F 226 supplies the PDO application to the browser 227-2.

The browser 227-2 is for example a particular browser defined in "BrowserProfileA" of NRT1.0. The browser 227-2 generates a video signal for data broadcasting by executing the PDO application from the recording section 225 or the communication I/F 226, and supplies the video signal to the video output section 218, under control from the control section 221.

The video output section 218 synthesizes the video signal supplied from the video decoder 217 and the video signal supplied from the browser 227-1 or the browser 227-2, and displays it on the display 219.

When NRT contents are transmitted via the Internet, the stream processing section 228 separates the stream of the NRT contents distributed from the distribution server 70 into an audio stream and a video stream, and records the audio stream and the video stream in the recording section 225. The NRT contents distributed via the Internet and related information related to the NRT contents are thereby recorded in the recording section 225.

The recording section 225 supplies the audio stream and the video stream that are recorded in the recording section 225 to the audio decoder 214 and the video decoder 217, respectively, under control from the control section 221. The NRT contents are thereby reproduced when an instruction to reproduce the NRT contents is given from the user.

The receiving device 20 is configured as described above.

<Example of Functional Configuration of Browser>

Figure 4:
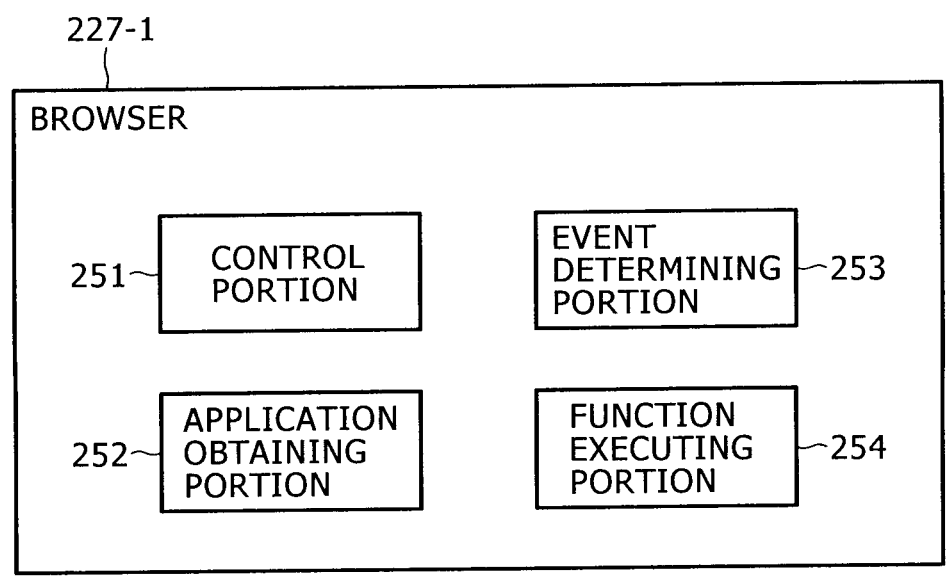
FIG. 4 is a diagram showing an example of functional configuration of a browser.

FIG. 4 is a diagram showing an example of functional configuration of the browser 227-1 in FIG. 3.

The browser 227-1 includes a control portion 251, an application obtaining portion 252, an event determining portion 253, and a function executing portion 254.

The control portion 251 controls the operation of each part of the browser 227-1 under control from the control section 221 (FIG. 3).

The application obtaining portion 252 controls the communication I/F 226 to obtain the NDO application from the application server 40. The application obtaining portion 252 starts and executes the obtained NDO application under control from the control portion 251.

The event determining portion 253 determines under control from the control portion 251 whether a predetermined event has occurred during the execution of the NDO application. The event determining portion 253 supplies a result of the event determination to the function executing portion 254.

The function executing portion 254 executes a function described as a script in the NDO application (HTML document for data broadcasting) being executed according to the event determination result from the event determining portion 253.

For example, a predetermined function is defined as a script in a predetermined script language such as JavaScript (registered trademark) or the like. Not only a function standardized by a predetermined standard but also a function for executing a process related to NRT contents is defined as this function. Details of the latter function will be described later with reference to FIGS. 10 to 18.

Incidentally, the description with reference to FIG. 4 has been made only of a case where the browser 227-1 executes the NDO application in order to simplify the description, and description of cases where the browser 227-1 executes the TDO application and the Web page is omitted.

The browser 227-1 is configured as described above.

<Example of Configuration of Application Server>

Figure 5:
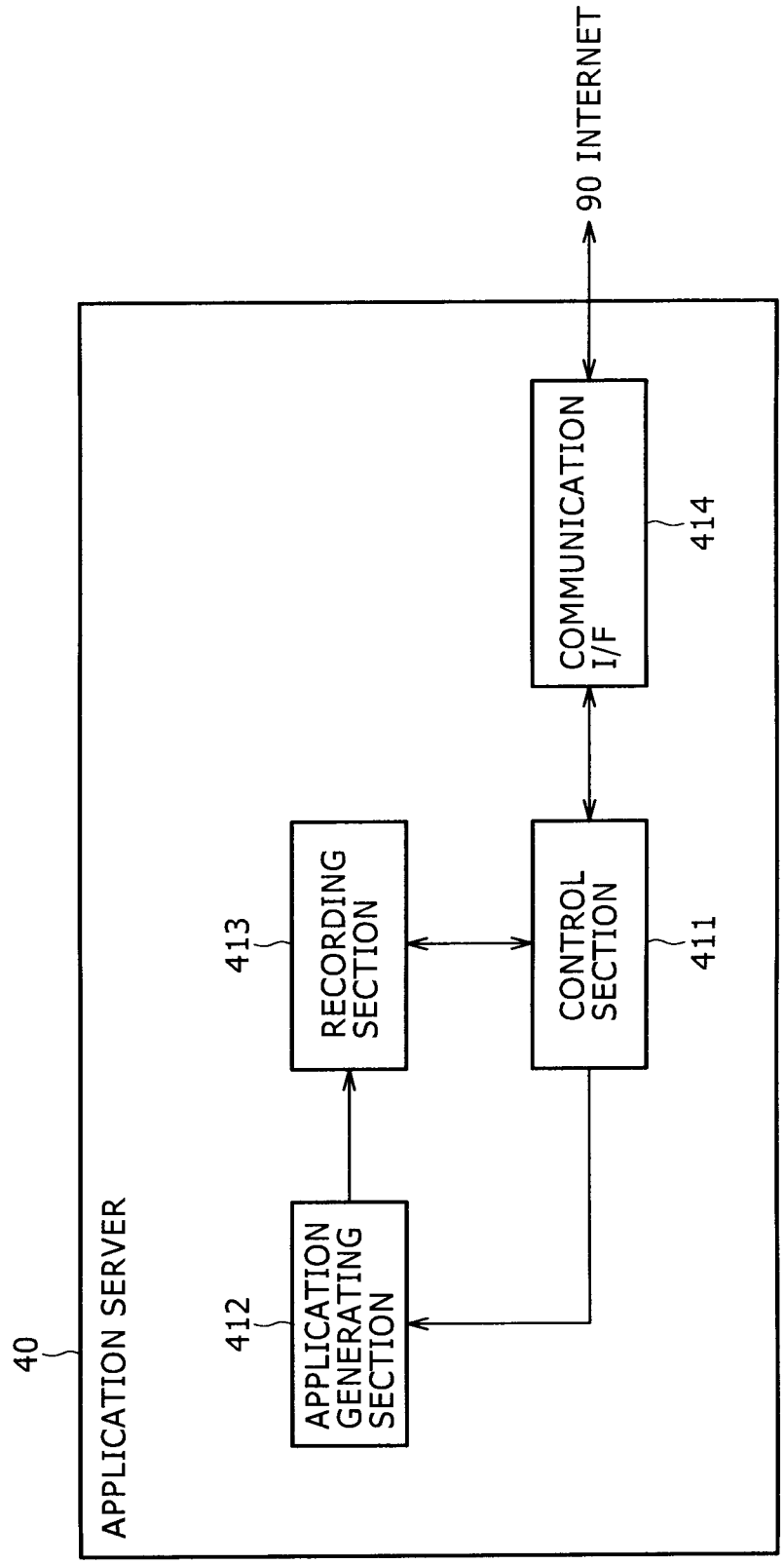
FIG. 5 is a diagram showing an example of configuration of an application server.

FIG. 5 shows an example of configuration of the application server 40 in FIG. 1.

The application server 40 includes a control section 411, an application generating section 412, a recording section 413, and a communication I/F 414.

The control section 411 controls the operation of each part of the application server 40.

The application generating section 412 generates the NDO application, and records the NDO application in the recording section 413, under control from the control section 411.

When the NDO application is requested from the receiving device 20, the control section 411 reads and obtains the NDO application from the recording section 413. The control section 411 controls the communication I/F 414 so as to transmit the NDO application to the receiving device 20 via the Internet 90.

The application server 40 is configured as described above.

Incidentally, the application server 30 and the application server 50 shown in FIG. 1 are basically configured in a similar manner to the application server 40 of FIG. 5, and therefore description thereof will be omitted.

Specifically, the application server 30 generates the TDO application in place of the NDO application, and the application server 50 generates the PDO application in place of the NDO application.

<Method of Management of Application Programs>

Figure 6:
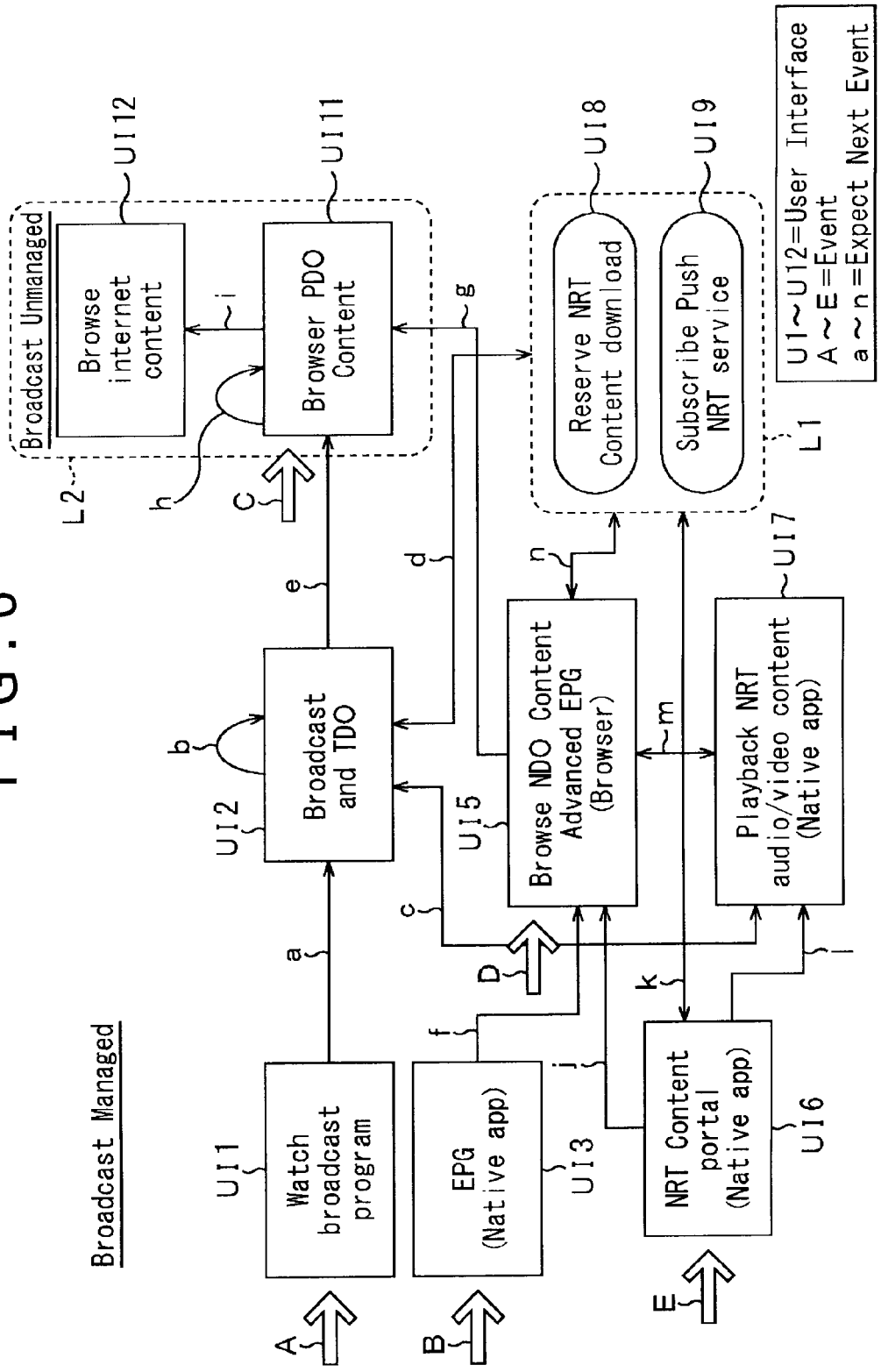
FIG. 6 is a diagram showing an example of transitions of a screen displayed on a display.

A method of management of application programs will next be described with reference to FIGS. 6 to 9. FIG. 6 shows transitions of a screen displayed on the display 219 of the receiving device 20 by executing the above-described application programs. An example of assumed use cases will next be described with reference to FIG. 6.

In FIG. 6, UI1 to UI12 (excluding UI8 and UI9) denote a user interface (User Interface, which will hereinafter be abbreviated to a UI) displayed on the display 219 of the receiving device 20. In addition, a dotted line L1 in FIG. 6 represents a boundary between foreground processing and background processing. The processing performed on UI8 and UI9 on the inside of the region of the dotted line L1 is performed internally without being displayed on the display 219.

In addition, A to E in FIG. 6 denote an event for making a transition to a certain UI, and a to n in FIG. 6 denote an event for making a transition from a certain UI to a next UI. Further, a dotted line L2 in FIG. 6 represents a boundary line between management modes. The management modes are set such that particular processing can be performed on the outside of the boundary, whereas the particular processing cannot be performed on the inside of the boundary.

Specifically, application programs obtained via the Internet 90 and executed in the receiving device 20 include not only an application program provided by the broadcaster but also application programs provided by other entities. Thus, from the viewpoint of operation thereof, particular processing implemented by the application programs provided by the other entities than the broadcaster needs to be limited.

Accordingly, when the receiving device 20 executes an HTML document describing an application program managed by the broadcaster such for example as the TDO application obtained from the application server 30 which TDO application is provided by the broadcaster, the execution of particular processing by the HTML document is permitted.

Conversely, when the receiving device 20 executes an HTML document describing an application program not managed by the broadcaster, such for example as the PDO application obtained from the application server 50 which PDO application is provided by another entity or the Web page obtained from the Web server 60, the execution of the particular processing by the HTML document is limited.

Specifically, "Broadcast Managed," which permits the particular processing to be performed using an HTML document for data broadcasting, is set as a management mode on the outside of the boundary of the dotted line L2 in FIG. 6, while "Broadcast Unmanaged," which does not permit the particular processing to be performed using an HTML document for data broadcasting or an HTML document for a homepage, is set as a management mode on the inside of the boundary.

Figure 7:
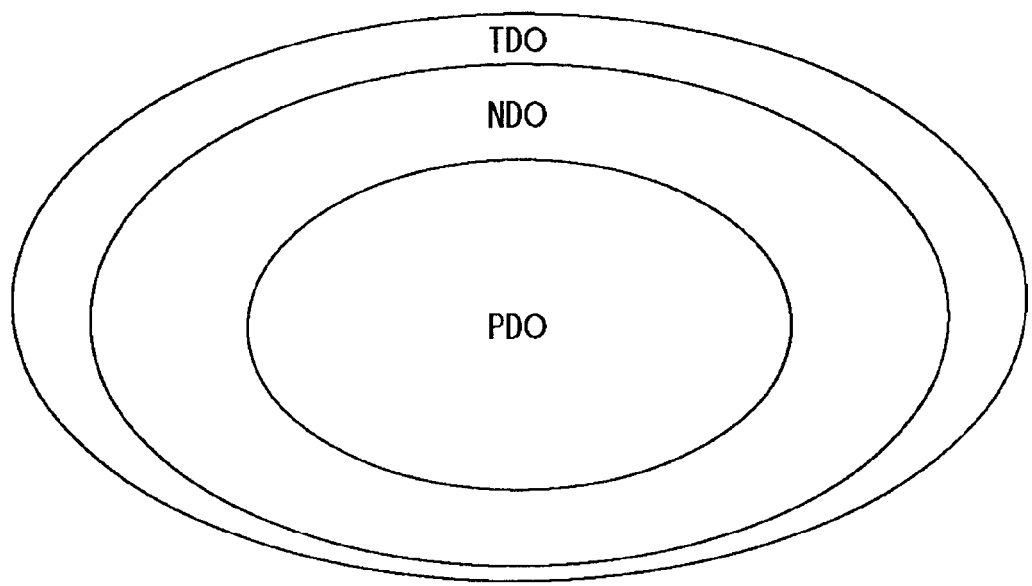
FIG. 7 is a diagram showing details of DOs.

Incidentally, "TDO," "NDO," and "PDO" in FIG. 6 correspond to the TDO application, the NDO application, and the PDO application, respectively. The limitation of authority is increased in order of PDO, NDO, and TDO, as shown in FIG. 7. Specifically, each DO (Declarative Object) has the following characteristics.

The TDO (Triggered Declarative Object) is a DO having the strongest authority among the three DOs, and is an object which can be handled by only the broadcaster. In addition, the TDO is the TDO application composed of an HTML document for data broadcasting, and is assumed to be executed according to trigger information in such a manner as to be operatively associated with broadcast contents such as a television program or the like.

In addition, because the TDO is a DO handled by the broadcaster, "Broadcast Managed" is invariably set as a management mode for the TDO.

The NDO (NRT Declarative Object) is a DO having the second strongest authority next to the TDO, and is an object which can be handled by another entity than the broadcaster, such as a content production company, a provider providing an NRT service, or the like. Further, the NDO is the NDO application composed of an HTML document for data broadcasting, and is assumed to be not only executed in such a manner as to be operatively associated with broadcast contents such as a television program or the like but also executed singly without being operatively associated with broadcast contents. For example, when the NDO is provided by an independent data broadcasting channel, the NDO is executed independently without being operatively associated with broadcast contents.

In addition, two kinds of NDOs, that is, NDOs licensed from the broadcaster and NDOs not licensed from the broadcaster, are assumed. As for management modes for these NDOs, "Broadcast Managed" is set to an NDO licensed from the broadcaster, and "Broadcast Unmanaged" is set to an NDO not licensed from the broadcaster. However, in the example of FIG. 6, description will be made only of an NDO licensed from the broadcaster. That is, in this case, "Broadcast Managed" is invariably set as a management mode for the NDO.

The PDO (Plain Declarative Object) is a DO which has the weakest authority among the three DOs, and is an object which can be displayed (executed) only by a specific application program (browser 227-2 in FIG. 3). For example, the PDO is the PDO application composed of an HTML document for data broadcasting, and can be displayed only by a browser defined in "BrowserProfileA" of NRT1.0. In addition, the PDO is an object that can be handled by another entity than the broadcaster, such as a content production company (for example a so-called third party) or the like.

In addition, as with NDOs, two kinds of PDOs, that is, PDOs licensed from the broadcaster and PDOs not licensed from the broadcaster, are assumed. However, in the example of FIG. 6, description will be made only of a PDO not licensed from the broadcaster. That is, in this case, "Broadcast Unmanaged" is invariably set as a management mode for the PDO.

Incidentally, FIG. 8 lists descriptions of the events A to E in FIG. 6, and FIG. 9 lists relations between UI1 to UI12 and the events a to n in FIG. 6. These drawings will be referred to as appropriate in the following description with reference to FIG. 6.

As shown in FIG. 6, when the user selects a predetermined channel as the event A, UI1 of a television program or the like on the selected channel is displayed on the display 219 (description of the event A in FIG. 8). In addition, when the receiving device 20 has received trigger information from the transmitting device 10 during the display of UI1, the receiving device 20 obtains the TDO application from the application server 30, and displays the TDO application in such a manner as to be superimposed on the video of the television program (description of the event a of UI1 in FIG. 9).

Because UI2 is on the outside of the boundary of the dotted line L2, "Broadcast Managed" is set as a management mode, and the particular processing can be performed by using the TDO application. That is, the TDO application is obtained by the application server 30 managed by the broadcaster, so that the particular processing is permitted.

In addition, when the receiving device 20 has received trigger information during the display of UI2, the receiving device 20 obtains and displays a new TDO application (description of the event b of UI2 in FIG. 9). The video of the TDO application superimposed on the video of the television program is thereby updated. Further, when the receiving device 20 has received the PDO application from the application server 50 during the display of UI2, the particular browser displays UI11 on the display 219 (description of the event e of UI2 in FIG. 9). In addition, when the user selects the PDO application as the event C, UI11 is displayed on the display 219.

Further, when the user selects another PDO application during the display of UI11, the PDO application is received from the application server 50, and the display of UI11 is updated (description of the event h of UI11 in FIG. 9). In addition, when the user selects a Web page during the display of UI11, the Web page is received from the Web server 60, and UI12 is displayed on the display 219 (description of the event i of UI11 in FIG. 9).

Because UI11 and UI12 are on the inside of the boundary of the dotted line L2, "Broadcast Unmanaged" is set as a management mode, and the particular processing cannot be performed using the PDO application or the Web page. That is, the PDO application or the Web page is obtained from the application server 50 or the Web server 60 not managed by the broadcaster, so that the particular processing is limited.

In addition, when the user has selected a start of reproduction of NRT contents during the display of UI2, UI7 of the NRT contents being reproduced is displayed on the display 219 (description of the event c of UI2 in FIG. 9). On the other hand, when the user selects stopping of the NRT contents being reproduced during the display of UI7, the NRT contents being reproduced are stopped, and the display of the display 219 returns to UI2 before the reproduction (description of the event c of UI7 in FIG. 9).

Incidentally, when the user selects a reservation for a download of NRT contents during the display of UI2, a process for reserving a download of the NRT contents is executed (description of the event d of UI8 in FIG. 9). At this time, when a procedure for subscribing to an NRT service to view the NRT contents is performed, a subscribing procedure process is executed (description of the event d of UI9 in FIG. 9). However, these processes are executed as background processing.

When the user presses an EPG button provided to the remote control 20R as the event B, UI3 of an electronic program listing (EPG (Electronic Program Guide)) is displayed on the display 219. When the user selects an item whose detailed program information is desired to be displayed from the electronic program listing, UI5 of the detailed program information is displayed on the display 219 (description of the event f of UI3 in FIG. 9).

In addition, when the user gives an instruction to start the NDO application, for example, as the event D, the NDO application is received from the application server 40, and UI5 of the NDO application is displayed on the display 219.

Because UI5 is on the outside of the boundary of the dotted line L2, "Broadcast Managed" is set as a management mode, and the particular processing can be performed using the NDO application. That is, the NDO application is obtained from the application server 40 managed by another entity, but is licensed from the broadcaster, so that the particular processing is permitted.

In addition, when the user selects desired NRT contents from a list of NRT contents, for example, during the display of UI5, a download of the NRT contents is reserved (description of the event n of UI5 in FIG. 9). In addition, the process of a procedure for subscribing to the NRT service (description of the event n of UI9 in FIG. 9) is executed as required together with the process of the download reservation (description of the event n of UI8 in FIG. 9). However, these processes are executed as background processing. Incidentally, the download of the selected NRT contents may be started immediately without the download reservation being made.

When the download of the NRT contents is completed or the NRT contents have already been downloaded, and the user has selected a start of reproduction of the NRT contents, UI7 of the NRT contents being reproduced is displayed on the display 219 (description of the event m of UI5 in FIG. 9). On the other hand, when the user selects stopping of the NRT contents being reproduced on UI7, the NRT contents being reproduced are stopped, and the display of the display 219 returns to UI5 before the reproduction (description of the event m of UI7 in FIG. 9).

Incidentally, when the user selects the PDO application during the display of UI5, the PDO application is received from the application server 50, and UI11 is displayed on the display 219 (description of the event g of UI5 in FIG. 9).

Further, when the user presses an NRT button provided to the remote control 20R as the event E, UI6 of a portal for NRT contents is displayed on the display 219. When the user selects the NDO application from the portal during the display of UI6, UI5 is displayed (description of the event j of UI6 in FIG. 9).

Incidentally, when the user selects a reservation for a download of NRT contents during the display of UI6, a process for reserving a download of the NRT contents is executed (description of the event k of UI6 or UI8 in FIG. 9). At this time, the process of a procedure for subscribing to the NRT service is executed as required (description of the event k of UI6 or UI9 in FIG. 9). In addition, when the user has selected a start of reproduction of the NRT contents during the display of UI6, UI7 of the NRT contents being reproduced is displayed on the display 219 (description of the event l of UI6 in FIG. 9). On the other hand, when the user selects stopping of the NRT contents during the display of UI7, the NRT contents being reproduced are stopped, and the display of the display 219 returns to UI6 before the reproduction (description of the event l of UI7 in FIG. 9).

As described above, the UIs make transitions according to each use case. In the example of FIG. 6, "Broadcast Managed" is set as a management mode for the TDO application and the NDO application, while "Broadcast Unmanaged" is set as a management mode for the PDO application and the Web page.

Incidentally, as described above, the area of the dotted line L2 as the management mode setting boundary shown in FIG. 6 is an example. For example, the NDO application licensed from the broadcaster is illustrated in FIG. 6. However, in the case of the NDO application not licensed from the broadcaster, "Broadcast Unmanaged" is set as a management mode. In this case, for example, UI5 is disposed on the inside of the boundary of the dotted line L2. In addition, the PDO application not licensed from the broadcaster is illustrated in the example of FIG. 6. However, in the case of the PDO application licensed from the broadcaster, "Broadcast Managed" is set as a management mode. In this case, for example, UI11 is disposed on the outside of the dotted line L2.

In short, while "Broadcast Managed" is invariably set to the TDO application, the management modes for the other applications, that is, the NDO application and the PDO application change according to the license of the broadcaster, and therefore the management mode of one of "Broadcast Managed" and "Broadcast Unmanaged" is arbitrarily set to the NDO application and the PDO application. In addition, "Broadcast Unmanaged" is invariably set as a management mode for a Web page (HTML for a homepage).

Incidentally, "Native app" described in FIG. 6 refers to an application program dedicated to the receiving device (application program executed by the control section 221 in FIG. 3). In addition, "Browser" refers to a browser for viewing Web pages and the like (browser 227-1 in FIG. 3).

<Functions for Executing Processes Related to NRT Contents>

NDO applications are provided by a plurality of entities other than the broadcaster. Thus, an NDO application is created for each entity. In addition, the NDO application composed of an HTML document for data broadcasting operates on the browser 227-1. Functions related to NRT contents are scheduled to be provided as functions thereof.

A common control system for controlling NRT contents is therefore desired to be provided in the NDO applications. The present technology accordingly makes it possible to provide the common control system for a plurality of entities by defining functions for executing processes related to NRT contents as scripts described in an NDO application composed of an HTML document for data broadcasting.

Details of the functions for providing the common control system will be described in the following.

(Function for Download Reservation)

FIG. 10 is a diagram of assistance in explaining a reserveNRTContentDownload function.

As shown in FIG. 10, the reserveNRTContentDownload function is a function for reserving a download of NRT contents.

The NRT contents whose download is to be reserved are identified by a Content Linkage described in the NRT-IT. Thus, a download of the NRT contents specified by the Content Linkage is reserved by specifying the Content Linkage as an argument of the function. In addition, as a return value of the function, "true," which indicates a success in the download reservation, "false," which indicates a failure in the download reservation, or "completion of a tentative reservation," which indicates that the registration of a tentative download reservation is completed, is returned. Incidentally, details of the registration of a tentative reservation will be described later.

(Function for Cancelling Download Reservation)

FIG. 11 is a diagram of assistance in explaining a cancelNRTContentDownloadReservation function.

As shown in FIG. 11, the cancelNRTContentDownloadReservation function is a function for cancelling a reservation for a download of NRT contents whose download has been reserved.

The NRT contents for which to make the cancellation are identified by a Content Linkage described in the NRT-IT. Thus, a reservation for a download of the NRT contents specified by the Content Linkage is cancelled by specifying the Content Linkage as an argument of the function. In addition, as a return value of the function, "true," which indicates a success in the download reservation, or "false," which indicates a failure in the download reservation, is returned.

(Function for Obtaining Download State)

FIG. 12 is a diagram of assistance in explaining a getNRTContentDownloadStatus function.

As shown in FIG. 12, the getNRTContentDownloadStatus function is a function for obtaining a download state of NRT contents whose download has been reserved.

The NRT contents whose download state is to be obtained are identified by a Content Linkage described in the NRT-IT. Thus, the download state of the NRT contents specified by the Content Linkage is obtained by specifying the Content Linkage as an argument of the function. In addition, as a return value of the function, a status is returned.

Three kinds of states, that is, "yet to be started," "being performed," and "completed" are provided as the status.

"Yet to be started" indicates that a download of the target NRT contents is not started.

"Being performed" indicates that a download of the target NRT contents is being performed. However, when the status is "being performed," information indicating the ratio of a size of already downloaded NRT contents to a total size of the NRT contents as the download object may also be obtained.

"Completed" indicates that a download of the target NRT contents has been completed.

Incidentally, when the Content Linkage of the NRT contents whose download state is to be obtained is not specified as an argument of the function, a list indicating the download states of all NRT contents whose download has been reserved is obtained.

(Function for Immediately Executing Download)

FIG. 13 is a diagram of assistance in explaining an executeNRTContentDownload function.

As shown in FIG. 13, the executeNRTContentDownload function is a function for immediately downloading NRT contents.

The NRT contents whose download is to be executed immediately are identified by a Content Linkage described in the NRT-IT. Thus, a download of the NRT contents specified by the Content Linkage is performed immediately by specifying the Content Linkage as an argument of the function. In addition, as a return value of the function, "true," which indicates a success in the immediate download execution, or "false," which indicates a failure in the immediate download execution, is returned.

When a download of the target NRT contents is to be executed immediately by the function, the NRT contents transmitted using a FLUTE session are obtained. Specifically, an FDT (File Delivery Table) for sending various kinds of attribute information of files for the NRT service is periodically transmitted in FLUTE sessions. Thus, the NRT contents are reconstructed from a plurality of files using index information described in the FDT. That is, the receiving device 20 can download the NRT contents transmitted by broadcast waves by using a FLUTE session.

Incidentally, when the Content Linkage of the target NRT contents is not specified as an argument of the function, all NRT contents being transmitted using a FLUTE session when the function is executed are obtained. However, at this time, the TDO application may be transmitted using the FLUTE session. As described above, the TDO application is started from trigger information. Therefore suppose that data determined to be the TDO application on the basis of type information or the like is not downloaded.

In addition, when the Content Linkage of the target NRT contents is specified as an argument of the function, and a download of the NRT contents transmitted using a FLUTE session has failed, the receiving device 20 accesses the distribution server 70 according to a URL described in the Internet Location Descriptor included in the NRT-IT. The receiving device 20 then downloads the NRT contents distributed via the Internet by the distribution server 70.

(Function for Stopping Download)

FIG. 14 is a diagram of assistance in explaining a cancelNRTContentDownload function.

As shown in FIG. 14, the cancelNRTContentDownload function is a function for stopping a download of NRT contents whose download is immediately executed by the executeNRTContentDownload function.

The NRT contents whose download is to be stopped are identified by a Content Linkage described in the NRT-IT. Thus, the download of the NRT contents specified by the Content Linkage is stopped by specifying the Content Linkage as an argument of the function. In addition, as a return value of the function, "true," which indicates a success in the stopping of the download, or "false," which indicates a failure in the stopping of the download, is returned.

Incidentally, the data of the NRT contents downloaded halfway until the download is stopped is discarded. In addition, even when the Content Linkage of the target NRT contents is not specified as an argument of the function, the download being executed at that time is forcefully terminated.

(Function for Deleting NRT Contents and Related Information Related to NRT Contents)

FIG. 15 is a diagram of assistance in explaining a deleteNRTContent function.

As shown in FIG. 15, the deleteNRTContent function is a function for deleting downloaded NRT contents and related information related to the NRT contents.

The NRT contents to be deleted are identified by a Content Linkage described in the NRT-IT. Thus, the NRT contents specified by the Content Linkage and the related information related to the NRT contents are deleted by specifying the Content Linkage as an argument of the function. In addition, as a return value of the function, "true," which indicates a success in the deletion, or "false," which indicates a failure in the deletion, is returned.

(Function for Obtaining Detailed Information)

FIG. 16 is a diagram of assistance in explaining a getNRTContentInformation function.

As shown in FIG. 16, the getNRTContentInformation function is a function for obtaining detailed information on downloaded NRT contents.

The NRT contents whose detailed information is to be obtained are identified by a Content Linkage described in the NRT-IT. Thus, detailed information on the NRT contents specified by the Content Linkage is obtained by specifying the Content Linkage as an argument of the function. In addition, as a return value of the function, the detailed information on the target NRT contents is returned.

Incidentally, when the Content Linkage of the target NRT contents is not specified as an argument of the function, detailed information on all downloaded NRT contents is obtained.

(Function for Obtaining Latest NRT-IT)

FIG. 17 is a diagram of assistance in explaining a getCurrentNRTIT function.

As shown in FIG. 17, the getCurrentNRTIT function is a function for obtaining a latest NRT-IT currently transmitted by broadcast waves. Details of the NRT-IT will be described later with reference to FIG. 21.

As a return value of the function, "true," which indicates a success in the obtainment of the NRT-IT, or "false," which indicates a failure in the obtainment of the NRT-IT, is returned.

(Function for Obtaining Information on Recording Space of Recording Section)

FIG. 18 is a diagram of assistance in explaining a getStorageInfo function.

As shown in FIG. 18, the getStorageInfo function is a function for obtaining recording space information on the recording space of the recording section 225.

As a return value of the function, the recording space information is returned. This recording space information includes information on a total space and an available space of the recording section 225.

As described above, the functions shown in FIGS. 10 to 18, for example, are defined as functions for executing processes related to NRT contents. However, the above-described functions are an example, and other functions for executing processes related to NRT contents may be defined. In addition, while all the functions return a return value in the above description of the functions, the cancelNRTContentDownload function, the deleteNRTContent function, and the getCurrentNRTIT function, for example, do not necessarily need to return a return value.

(Example of Description of Script)

An example of description of a script will next be described with reference to FIG. 19.

FIG. 19 shows an example of description of the getStorageInfo function (FIG. 18) described as a script in the NDO application (HTML document for data broadcasting).

As shown in FIG. 19, the NDO application is described in HTML. A title element and a meta element are described in a head element. The meta element specifies that JavaScript (registered trademark) be used as a script.

A SCRIPT element is described in a body element. JavaScript instructions, the function, and the like are described in the SCRIPT element.

In the example of FIG. 19, total_size and used_size are defined as storage variables to obtain the recording space information including the total space and the available space of the recording section 225. The recording space information is obtained by executing strage.getStorageInfo( ). In addition, the obtained recording space information is displayed by executing document.write(storage).

As described above, FIG. 19 shows an example of description of the getStorageInfo function. The other functions described above can also be similarly described in a SCRIPT element described in the HTML document.

<Details of Concrete Processes Executed in Respective Devices>

Description will next be made of details of concrete processes executed in the respective devices forming the broadcasting-communication cooperation system 1 of FIG. 1.

(Transmitting Process)

A transmitting process executed by the transmitting device 10 will first be described with reference to a flowchart of FIG. 20.

In step S111, the audio obtaining section 111 obtains an audio signal corresponding to the audio of broadcast contents from an external server or the like. In addition, in step S112, the video obtaining section 113 obtains a video signal corresponding to the video of the broadcast contents from the external server or the like.

In step S113, the trigger information generating section 114 determines whether to transmit trigger information. When it is determined in step S113 that trigger information is to be transmitted, the process is advanced to step S114.

In step S114, the trigger information generating section 114 generates trigger information according to the progress of the video of the video signal obtained by the video obtaining section 113. When it is determined in step S113 that trigger information is not to be transmitted, on the other hand, the process of step S114 is skipped, and the process is advanced to step S115.

In step S115, the audio encoder 112 encodes the audio signal obtained by the audio obtaining section 111.

In step S116, the video encoder 115 encodes the video signal obtained by the video obtaining section 113. In addition, when the trigger information is generated in step S114, the video encoder 115 disposes the trigger information within caption data in the user data area of a video stream obtained by the encoding.

In step S117, the download information generating section 116 determines whether to transmit an NRT-IT. When it is determined in step S117 that the NRT-IT is to be transmitted, the process is advanced to step S118.

In step S118, the download information generating section 116 generates the NRT-IT on the basis of information on NRT contents whose download can be reserved.

Figure 21:
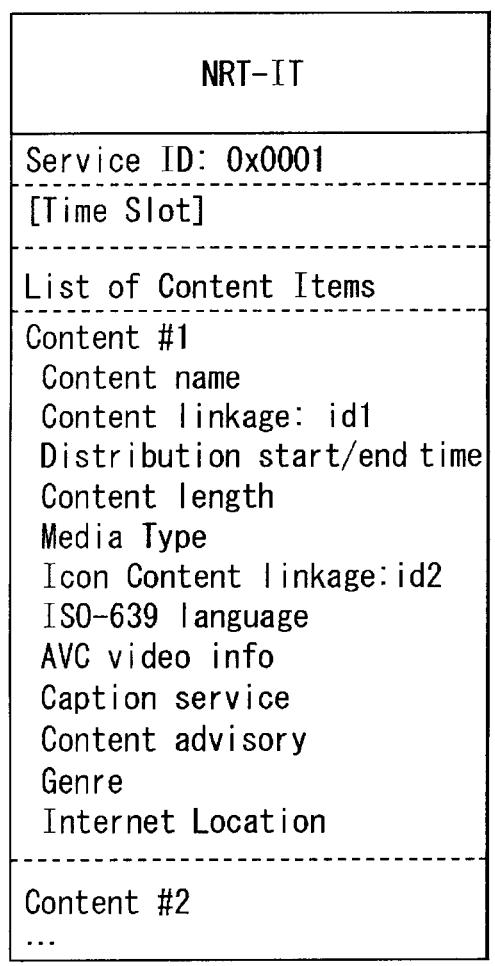
FIG. 21 is a diagram showing an example of configuration of an NRT-IT.

FIG. 21 is a diagram showing a configuration of the NRT-IT. Attribute information at a content level included in one NRT service is described in the NRT-IT (NRT Information table). For example, attribute information in units of NRT contents such as Contents #1, #2, . . . is described in the NRT-IT.

A Service ID for identifying the NRT service is described in the NRT-IT. In addition, the following items are described for a unit of NRT contents in the NRT-IT.

The name of the NRT contents is described as Content name. Information for identifying the NRT contents is described as Content Linkage. Information indicating a starting time and an ending time of the NRT contents is described as Distribution start/end time.

The size of data of the NRT contents is described as Content length. Information indicating the type of the NRT contents is described as Media Type. Icon identifying information is described as Icon Content Linkage.

A language such for example as Japanese or English is described as ISO-639 language. Information on video data compression is described in AVC video info. Information on a caption is described in Caption service. Information on recommendation in regard to the NRT contents is described as Content advisory. Information indicating the genre of the NRT contents is described as Genre.

In addition, the URL of the distribution server 70, for example, is described as Internet Location as information for obtaining the NRT contents distributed via the Internet 90. That is, when the receiving device 20 cannot receive the NRT contents transmitted by broadcast waves for some reason, the receiving device 20 can refer to the Internet Location and obtain the NRT contents distributed from the distribution server 70 via the Internet.

Incidentally, though not described in detail, information on the NRT contents other than the above-described items can be described in the NRT-IT.

Returning to the flowchart of FIG. 20, when it is determined in step S117 that the NRT-IT is not to be transmitted, the process of step S118 is skipped, and the process is advanced to step S119.

In step S119, the multiplexing section 117 generates a transport stream by multiplexing the audio stream encoded by the audio encoder 112 and the video stream encoded by the video encoder 115. However, when the NRT-IT is generated in step S118, the multiplexing section 117 generates the transport stream by further multiplexing the NRT-IT in addition to the audio stream and the video stream.

In step S120, the transmitting section 118 transmits the transport stream generated by the multiplexing section 117 as a broadcast signal via the antenna 119. The process thereafter is returned to step S111 to repeat the process from step S111 on down.

Incidentally, description has been made of a case where the broadcast contents are transmitted by the normal broadcast in the transmitting process of FIG. 20. However, a basically similar process is executed also when NRT contents are transmitted by the NRT broadcast. That is, when NRT contents are transmitted by the NRT broadcast, the transmitting device 10 transmits the NRT contents by executing the transmitting process of FIG. 20 according to a predetermined distribution schedule.

However, in the NRT broadcast, the NRT contents are transmitted using a FLUTE session. In addition, because the trigger information and the NRT-IT do not need to be transmitted, processes related to the trigger information and the NRT-IT (S113, S114, S117, and S118) in the transmitting process of FIG. 20 are not executed. Incidentally, a basically similar process is executed also when the distribution server 70 distributes the NRT contents via the Internet, and therefore description thereof will be omitted.

That concludes the description of the transmitting process.
(Receiving Process)

Figure 22:
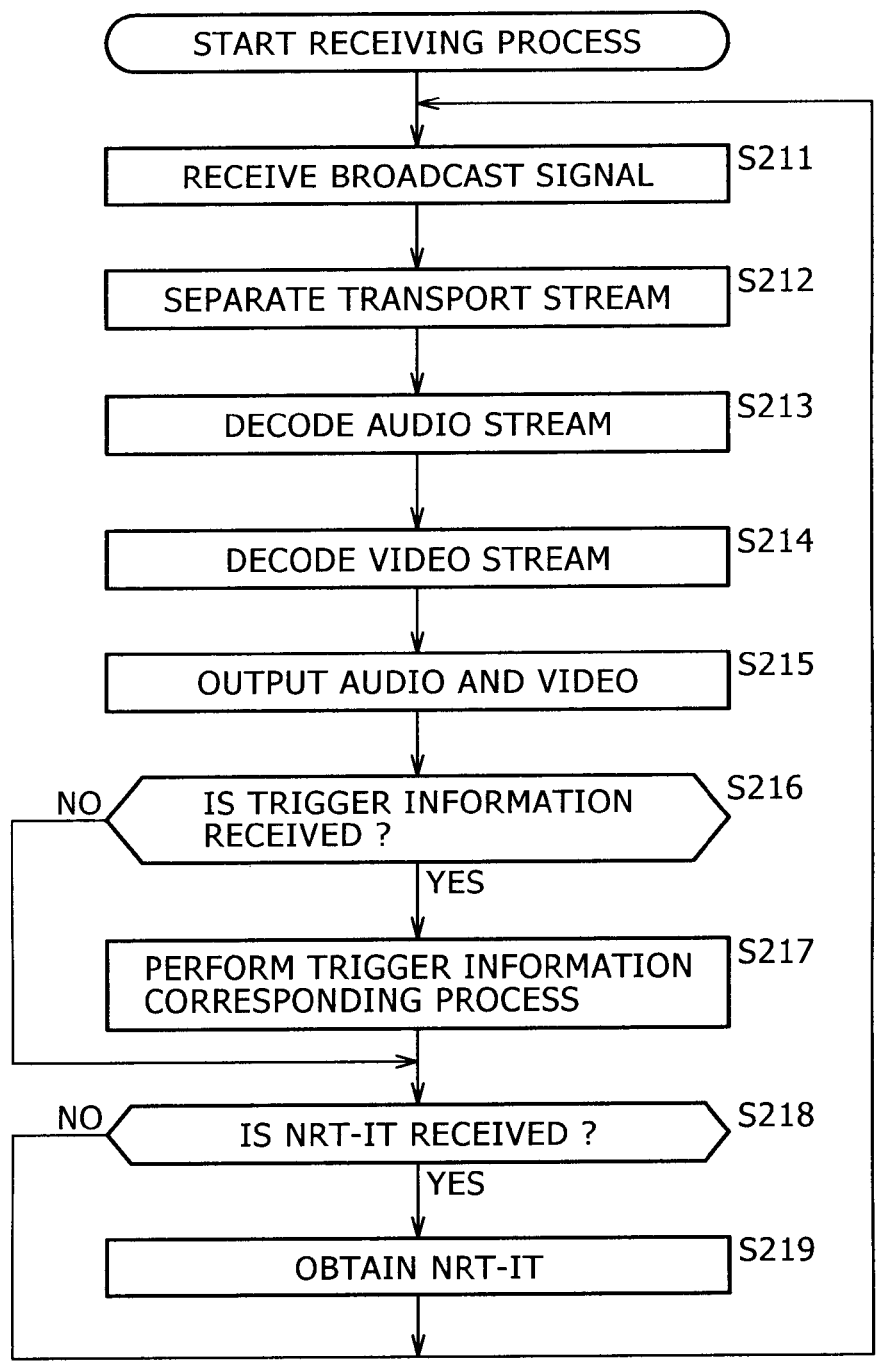
FIG. 22 is a flowchart of assistance in explaining a receiving process.

A receiving process executed by the receiving device 20 will next be described with reference to a flowchart of FIG. 22.

In step S211, the tuner 212 receives and demodulates a broadcast signal via the antenna 211.

In step S212, the demultiplexing section 213 separates the transport stream demodulated by the tuner 212 into an audio stream and a video stream.

In step S213, the audio decoder 214 decodes the audio stream separated by the demultiplexing section 213, and generates an audio signal.

In step S214, the video decoder 217 decodes the video stream separated by the demultiplexing section 213, and generates a video signal.

In step S215, the speaker 216 outputs audio corresponding to the audio signal. In addition, the display 219 displays video corresponding to the video signal. Thereby, the display 219 displays the video of broadcast contents such as a television program or the like, and the speaker 216 outputs the audio corresponding to the video.

In step S216, the control section 221 determines whether the trigger information from the transmitting device 10 is received. When it is determined in step S216 that the trigger information is received, the process is advanced to step S217.

In step S217, the control section 221 controls the browser 227-1 to execute a trigger information corresponding process on the basis of the trigger information. Specifically, the browser 227-1 controls operation such as the obtainment and execution (starting) of the TDO application, event firing or ending, and the like under control from the control section 221.

When it is determined in step S216 that the trigger information is not received, on the other hand, step S217 is skipped, and the process is advanced to step S218.

In step S218, the control section 221 determines whether the NRT-IT from the transmitting device 10 is received. When it is determined in step S218 that the NRT-IT is received, the process is advanced to step S219.

In step S219, the control section 221 obtains the received NRT-IT, and records the NRT-IT in the memory 222. In this case, the NRT-IT shown in FIG. 21 described above is obtained, and is referred to as appropriate when a process related to NRT contents is executed.

When it is determined in step S218 that the NRT-IT is not received, or when the process of obtaining the NRT-IT in step S219 is ended, the process returns to step S211 to repeat the process from step S211 on down.

That concludes the description of the receiving process.

(NRT Contents Related Process)

An NRT contents related process executed by the receiving device 20 will next be described with reference to a flowchart of FIG. 23.

In step S231, the control section 221 determines whether an instruction to start the NDO application is given on the basis of an operating signal from the infrared receiving section 224 or the like. When an instruction to start the NDO application is given, the process is advanced to step S232.

In step S232, the application obtaining portion 252 controls the communication I/F 226 to obtain the NDO application from the application server 40.

In step S233, the application obtaining portion 252 starts the NDO application under control from the control portion 251.

In step S234, the event determining portion 253 determines whether a predetermined event has occurred. When it is determined in step S234 that no predetermined event has occurred, the determining process of step S234 is repeated until a predetermined event occurs. When it is then determined in step S234 that a predetermined event has occurred, the process is advanced to step S235.

In step S235, the browser 227-1 executes an event corresponding process under control from the control section 221. In the event corresponding process, a function corresponding to the event that has occurred is executed. Incidentally, details of the event corresponding process will be described later with reference to a flowchart of FIG. 24.

When the event corresponding process of step S235 is ended, the process is advanced to step S236. The control section 221 determines in step S236 whether an instruction to end the NDO application is given on the basis of an operating signal from the infrared receiving section 224 or the like.

When it is determined in step S236 that no instruction to end the NDO application is given, the process returns to step S234 to repeat the process from step S234 on down. When an instruction to end the NDO application is given in step S236, the process returns to step S231 to repeat the process from step S231 on down.

That concludes the description of the NRT contents related process.

(Event Corresponding Process)

The event corresponding process corresponding to step S235 in FIG. 23 will next be described with reference to a flowchart of FIG. 24.

In step S251, the event determining portion 253 determines whether an instruction to reserve a download of NRT contents is given under control from the control portion 251. When it is determined in step S251 that an instruction to reserve the download is given, the process is advanced to step S252.

In step S252, the function executing portion 254 executes the getStorageInfo function described as a script in the NDO application (HTML document for data broadcasting) being executed, under control from the control portion 251. Recording space information is obtained by executing the getStorageInfo function.

In step S253, the control portion 251 determines whether a sufficient recording space for recording the NRT contents whose download is to be reserved remains in the recording section 225 on the basis of the recording space information.

When it is determined in step S253 that a sufficient recording space for recording the NRT contents does not remain, the process is advanced to step S254. In step S254, the control portion 251 makes a message displayed to an effect that the download of the target NRT contents cannot be reserved because of a shortage of recording space. In this case, the download reservation is not made, and the process returns to step S235 in FIG. 23 to execute the process from step S235 on down.

When it is determined in step S253 that a sufficient recording space for recording the NRT contents remains, the process is advanced to step S255. In step S255, the function executing portion 254 executes the reserveNRTContentDownload function described as a script in the NDO application (HTML document for data broadcasting) being executed, under control from the control portion 251. When the reserveNRTContentDownload function has been executed, the process is advanced to step S256.

In step S256, the function executing portion 254 determines under control from the control portion 251 whether the NRT-IT periodically transmitted from the transmitting device 10 is recorded in the memory 222. When it is determined in step S256 that the NRT-IT is recorded, the process is advanced to step S257.

In step S257, the function executing portion 254 analyzes the NRT-IT recorded in the memory 222 under control from the control portion 251. Then, after the analyzing process of step S257 is ended, the process is advanced to step S258.

In step S258, the function executing portion 254 determines under control from the control portion 251 whether identifying information identifying NRT contents included in the NRT-IT and identifying information identifying the NRT contents to be reserved coincide with each other on the basis of a result of the analysis in step S257. In this case, as the identifying information identifying the NRT contents, a Content Linkage described in the NRT-IT and a Content Linkage specified as an argument of the reserveNRTContentDownload function, for example, are used.

When it is determined in step S258 that the identifying information as objects of comparison coincides, the process is advanced to step S259. In step S259, the function executing portion 254 registers a final reservation for the NRT contents to be reserved which NRT contents are identified by the Content Linkage specified as the argument of the reserveNRTContentDownload function, under control from the control portion 251. The control section 221 records information on the reservation in the memory 222.

The final reservation in this case means that a download reservation has been actually made, and is different in meaning from a tentative reservation. That is, a tentative reservation only tentatively reserves the NRT contents for which a download reservation is expected to be made, and thereafter a reservation is actually made by further making a final reservation.

In addition, at this time, the function executing portion 254 registers the final reservation such that the target NRT contents are downloaded at an earliest distribution time in a distribution schedule determined by the NRT-IT, under control from the control portion 251. However, at this time, when there are other NRT contents already reserved, and the download time of the other NRT contents overlaps, priority is given to the existing reservation, and the final reservation is registered such that the NRT contents to be reserved will be downloaded at a next distribution time.

When it is determined in step S256 that the NRT-IT is not recorded, the process is advanced to step S260. In step S260, the function executing portion 254 registers a tentative reservation for the NRT contents to be reserved which NRT contents are identified by the Content Linkage specified as the argument of the reserveNRTContentDownload function under control from the control portion 251. The control section 221 records information on the reservation in the memory 222.

It is to be noted that the reservation at this point is a tentative reservation, and that the registration of the tentative reservation therefore does not guarantee that the download will be surely performed.

After the tentative reservation is registered in step S260, the process is advanced to step S261. In step S261, the function executing portion 254 executes the getCurrentNRTIT function described as a script in the NDO application (HTML document for data broadcasting) being executed, under control from the control portion 251.

After the getCurrentNRTIT function is executed in step S261, the control section 221 in step S262 obtains the latest NRT-IT currently transmitted by broadcast waves. The latest NRT-IT is recorded in the memory 222.

After the latest NRT-IT is obtained in step S262, the process is advanced to step S257. In step S257, the function executing portion 254 analyzes the newly obtained NRT-IT under control from the control portion 251. Then, when it is determined in step S258 that the identifying information identifying the NRT contents coincides, a final reservation for the NRT contents to be reserved is registered (S259).

When it is determined in step S258 that the identifying information identifying the NRT contents does not coincide, the process is advanced to step S263. In step S263, the function executing portion 254 determines under control from the control portion 251 whether the NRT contents to be reserved are already reserved tentatively.

When it is determined in step S263 that the NRT contents to be reserved are reserved tentatively, the process is advanced to step S261. Then, the above-described process of steps S261 and S262 is executed to obtain the latest NRT-IT. Thereafter, the latest NRT-IT is analyzed again (S257), and whether the registration of a final reservation is possible is determined (S258).

When it is determined in step S263 that the NRT contents to be reserved are not reserved tentatively, the process is advanced to step S260. Then, a tentative reservation is registered by the above-described process of step S260, and then the latest NRT-IT is obtained by the process of steps S261 and S262. Thereafter, as in the above, the latest NRT-IT is analyzed (S257), and whether the registration of a final reservation is possible is determined (S258).

Specifically, in a case where the NRT-IT of the NRT contents to be reserved has not yet been transmitted by broadcast waves when a download reservation is to be made by the reserveNRTContentDownload function, a tentative reservation for the NRT contents to be reserved is registered, and the process is ended temporarily. The receiving device 20 thereafter receives the NRT-IT periodically transmitted from the transmitting device 10. Thus, when the newly received and updated NRT-IT includes information on the NRT contents to be reserved, a final reservation is registered such that the NRT contents to be reserved which NRT contents are reserved tentatively will be downloaded at a predetermined distribution time.

After the registration of the final reservation is completed in step S259, the event corresponding process is ended. The process thereafter returns to step S235 in FIG. 23 to execute the process from step S235 on down.

The event corresponding process in a case where an event of giving an instruction to reserve a download of NRT contents has occurred has been described above. When it is determined in step S251 that no instruction to reserve a download of NRT contents is given, the process is advanced to step S264.

In step S264, the event determining portion 253 determines under control from the control portion 251 whether an instruction to cancel a reservation for a download of NRT contents is given. When it is determined in step S264 that an instruction to cancel the download reservation is given, the process is advanced to step S265.

In step S265, the function executing portion 254 executes the cancelNRTContentDownloadReservation function described as a script in the NDO application (HTML document for data broadcasting) under control from the control portion 251. The execution of the cancelNRTContentDownloadReservation function deletes reservation information identified by a Content Linkage specified as an argument which reservation information is included in the reservation information recorded in the memory 222, and cancels the reservation for a download of the NRT contents for which a final reservation has been registered.

After the download reservation is cancelled in step S265, the event corresponding process is ended. The process thereafter returns to step S235 in FIG. 23 to execute the process from step S235 on down.

The event corresponding process in a case where an event of giving an instruction to cancel a reservation for a download of NRT contents has occurred has been described above. When it is determined in step S264 that no instruction to cancel a reservation for a download of NRT contents is given, the process is advanced to step S266.

In step S266, the event determining portion 253 determines under control from the control portion 251 whether an instruction to reproduce NRT contents is given. When it is determined in step S266 that an instruction to reproduce NRT contents is given, the process is advanced to step S267.

In step S267, the function executing portion 254 executes a function for reproducing the NRT contents which function is standardized by a predetermined standard, under control from the control portion 251.

Specifically, in addition to the functions shown in FIGS. 10 to 18 described above, functions for executing processes related to NRT contents are standardized and defined by a predetermined standard. The function executing portion 254 can execute these standardized functions. For example, the CEA 2014 standard defines a Play function for starting the reproduction of NRT contents, a Stop function for stopping the reproduction of NRT contents being reproduced, a seek function for moving the reproduction position of NRT contents, and the like.

Thus, in this case, the reproduction of the specified NRT contents is started by executing the Play function.

After the reproducing process is executed in step S267, the event corresponding process is ended. The process thereafter returns to step S235 in FIG. 23 to execute the process from step S235 on down.

The event corresponding process in a case where an event of giving an instruction to reproduce NRT contents has occurred has been described above. When it is determined in step S266 that no instruction to reproduce NRT contents is given, the process is advanced to step S268.

In step S268, the event determining portion 253 determines under control from the control portion 251 whether an instruction to delete NRT contents is given. When it is determined in step S268 that an instruction to delete NRT contents is given, the process is advanced to step S269.

In step S269, the function executing portion 254 executes the deleteNRTContent function described as a script in the NDO application (HTML document for data broadcasting) being executed, under control from the control portion 251. The execution of the deleteNRTContent function deletes, from the recording section 225, the data of the NRT contents identified by a Content Linkage specified as an argument among downloaded NRT contents recorded in the recording section 225 and related information related to the NRT contents identified by the Content Linkage.

After the NRT contents and the related information related to the NRT contents are deleted in step S269, the event corresponding process is ended. The process thereafter returns to step S235 in FIG. 23 to execute the process from step S235 on down.

The event corresponding process in a case where an event of giving an instruction to delete NRT contents has occurred has been described above. When it is determined in step S268 that no instruction to delete NRT contents is given, the process is advanced to step S270.

Figure 23:
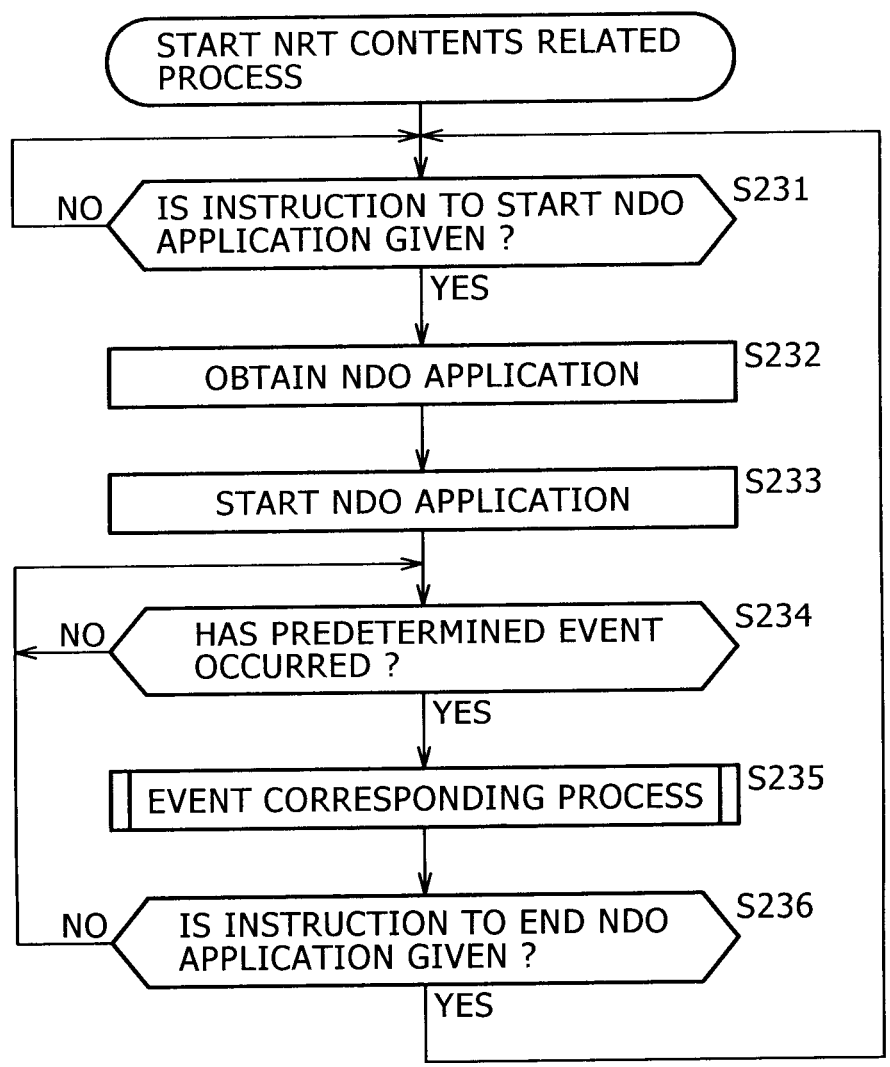
FIG. 23 is a flowchart of assistance in explaining an NRT contents related process.

In step S270, the function executing portion 254 executes a function according to an event that has occurred in step S234 in FIG. 23 under control from the control portion 251.

Figure 24:
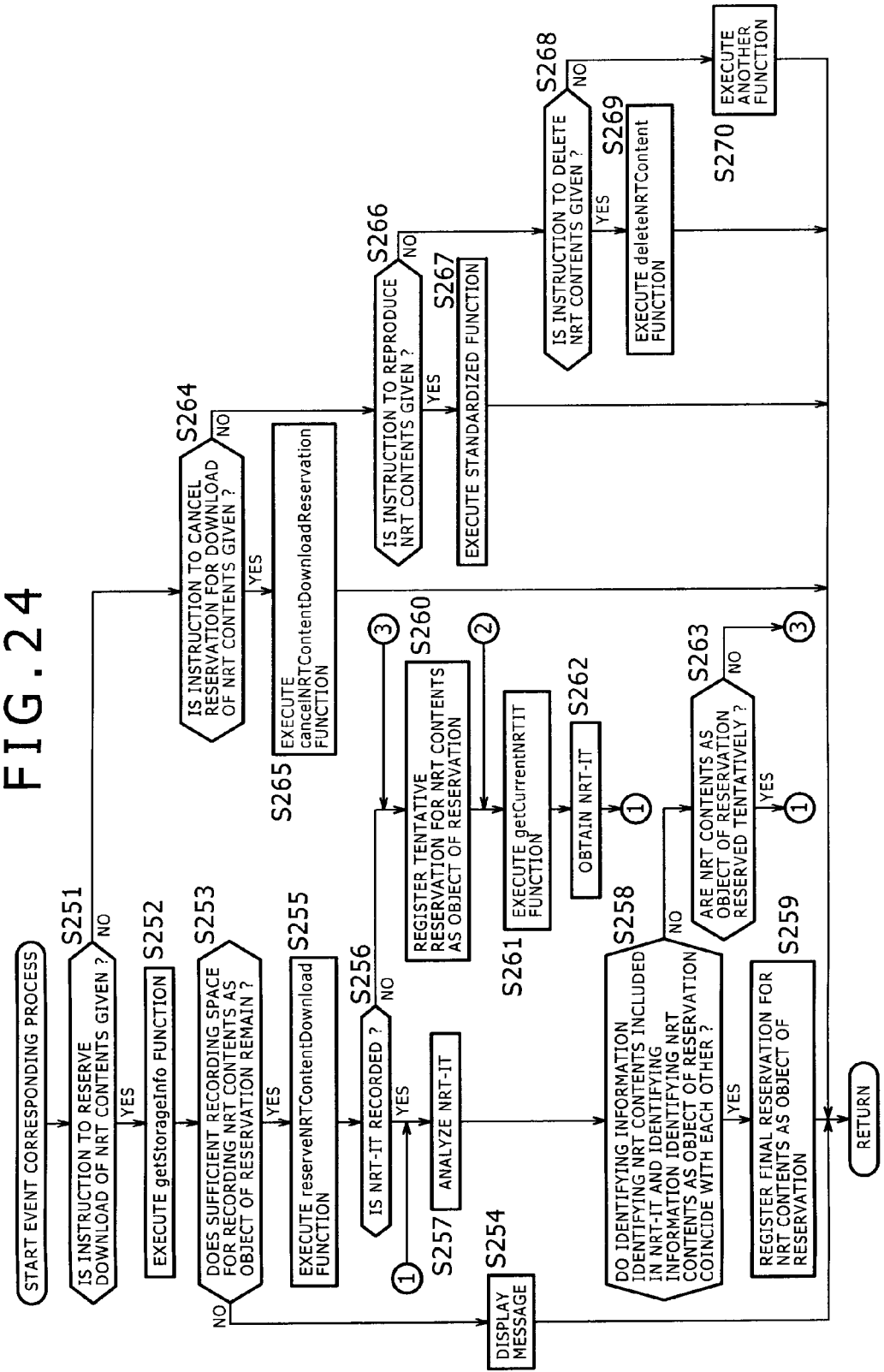
FIG. 24 is a diagram of assistance in explaining details of an event corresponding process.

Specifically, while a case where the reserveNRTContentDownload function, the getStorageInfo function, the getCurrentNRTIT function, the cancelNRTContentDownloadReservation function, and the deleteNRTContent function are executed according to the various kinds of events in the event corresponding process of FIG. 24 has been described as a concrete example, other functions not described above are also executed according to various kinds of events. For example, the browser 227-1 executes the getNRTContentDownloadStatus function, the executeNRTContentDownload function, the cancelNRTContentDownload function, or the getNRTContentInformation function according to the various kinds of events.

In addition, the event corresponding process of FIG. 24 is an example, and the functions cited above may be executed according to other events than the above-described events. For example, in the description with reference to FIG. 24, the getStorageInfo function is executed to determine whether a sufficient recording space remains at a time of a download reservation. However, the getStorageInfo function may be executed in another case, for example, where whether there is a recording space remaining in the recording section 225 is determined immediately before a start of a download of NRT contents already reserved or where the available space of the recording section 225 is presented to the user.

That concludes the description of the event corresponding process.

(Example of Screen Transitions)

Figure 25:
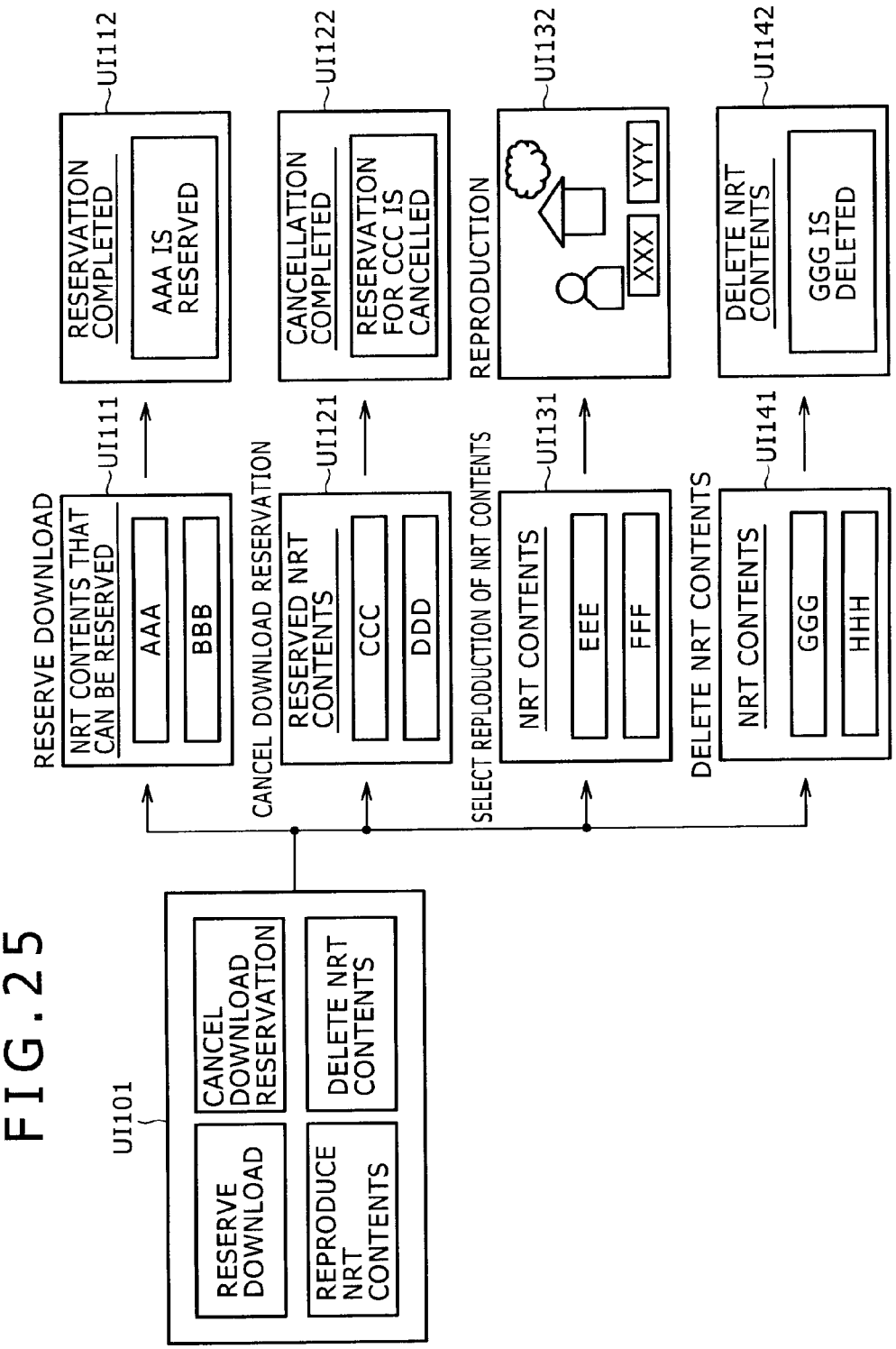
FIG. 25 is a diagram showing an example of screen transitions of the receiving device.

FIG. 25 is a diagram showing a concrete example of screen transitions when the event corresponding process of FIG. 24 is executed.

As shown in FIG. 25, when the event D in FIG. 6 has occurred, the NDO application is received from the application server 40, and UI101 of the NDO application is displayed on the display 219. UI101 is a menu screen that presents items for executing various kinds of processes related to NRT contents. The items "RESERVE DOWNLOAD," "CANCEL DOWNLOAD RESERVATION," "REPRODUCE NRT CONTENTS," and "DELETE NRT CONTENTS" are displayed on UI101.

When "RESERVE DOWNLOAD" is selected on UI101, UI111 is displayed. UI111 displays "AAA" and "BBB" as NRT contents that can be reserved. In addition, the reserveNRTContentDownload function is described in a SCRIPT element in the NDO application (HTML document for data broadcasting).

In this case, for example, when the user selects "AAA" by operating the remote control 20R, the reserveNRTContentDownload function is executed with the Content Linkage of "AAA" as an argument. Thereby, the event corresponding process in the case where an instruction to reserve a download of NRT contents is given (steps S251 to S263 in FIG. 24) is executed, and a final reservation for "AAA" is registered. When the registration of the final reservation is completed, UI112 is displayed.

In addition, when "CANCEL DOWNLOAD RESERVATION" is selected on UI101, UI121 is displayed. UI121 displays "CCC" and "DDD" as NRT contents whose download has been reserved. In addition, the cancelNRTContentDownloadReservation function is described in a SCRIPT element in the NDO application (HTML document for data broadcasting).

In this case, for example, when the user selects "CCC" by operating the remote control 20R, the cancelNRTContentDownloadReservation function is executed with the Content Linkage of "CCC" as an argument. Thereby, the event corresponding process in the case where an instruction to cancel a reservation for a download of NRT contents is given (steps S264 to S265 in FIG. 24) is executed, and a reservation for a download of "CCC" is cancelled. When the cancellation of the registration of the final reservation is completed, UI122 is displayed.

In addition, when "REPRODUCE NRT CONTENTS" is selected on UI101, UI131 is displayed. UI131 displays "EEE" and "FFF" as NRT contents that can be reproduced.

In this case, for example, when the user selects "EEE" by operating the remote control 20R, the Play function standardized by the CEA 2014 standard is executed. Thereby, the event corresponding process in the case where an instruction to reproduce NRT contents is given (steps S266 to S267 in FIG. 24) is executed, and "EEE" is reproduced. When the reproduction of "EEE" is started, UI132 is displayed.

Further, when "DELETE NRT CONTENTS" is selected on UI101, UI141 is displayed. UI141 displays "GGG" and "HHH" as downloaded NRT contents. In addition, the deleteNRTContent function is described in a SCRIPT element in the NDO application (HTML document for data broadcasting).

In this case, for example, when the user selects "GGG" by operating the remote control 20R, the deleteNRTContent function is executed with the Content Linkage of "GGG" as an argument. Thereby, the event corresponding process in the case where an instruction to delete NRT contents is given (steps S268 to S269 in FIG. 24) is executed, and "GGG" is deleted from the recording section 225. When the deletion of "GGG" is completed, UI142 is displayed.

The screen transitions at the times of executing the event corresponding process are made as described above.

(Process of Downloading NRT Contents)

A process of downloading NRT contents which process is executed by the receiving device 20 will next be described with reference to a flowchart of FIG. 26.

In step S291, the control section 221 determines whether the reservation starting time of NRT contents for which a final reservation has been registered has arrived, referring to reservation information recorded in the memory 222. Incidentally, this reservation starting time is identified by the Distribution start/end time described in the NRT-IT. Then, after waiting until the reservation starting time of the NRT contents arrives, the process is advanced to step S292.

In step S292, the control section 221 controls the tuner 212 to download the target NRT contents transmitted by broadcast waves using a FLUTE session.

Specifically, a transport stream demodulated by the tuner 212 is demultiplexed by the demultiplexing section 213, and recorded in the recording section 225. Incidentally, various kinds of related information are also recorded in the recording section 225 together with the NRT contents.

After the download of the NRT contents is ended, the process is advanced to step S293. In step S293, the control section 221 determines whether the download of the NRT contents whose download was started after the reservation starting time passed has succeeded.

When it is determined in step S293 that the download of the NRT contents has failed, the process is advanced to step S294. In step S294, the control section 221 controls the communication I/F 226 to download the NRT contents distributed via the Internet by the distribution server 70. Incidentally, the URL of the distribution server 70 can be obtained from the Internet Location described in the NRT-IT.

Specifically, the data of the audio stream and the video stream of the NRT contents received by the communication I/F 226 is recorded in the recording section 225. That is, even if the NRT contents transmitted by broadcast waves cannot be received, the NRT contents distributed via the Internet by the distribution server 70 can be received. Thereby the receiving device 20 can surely download the NRT contents.

When it is determined in step S293 that the download of the NRT contents has succeeded, the process of step S294 is skipped. Then, after the process of step S294 is ended, the process returns to step S291 to repeat the process from step S291 on down.

Incidentally, when downloads of two or more NRT contents are reserved, the process of steps S291 to S294 is repeated to download all of the NRT contents whose reservation starting times have passed.

Figure 26:
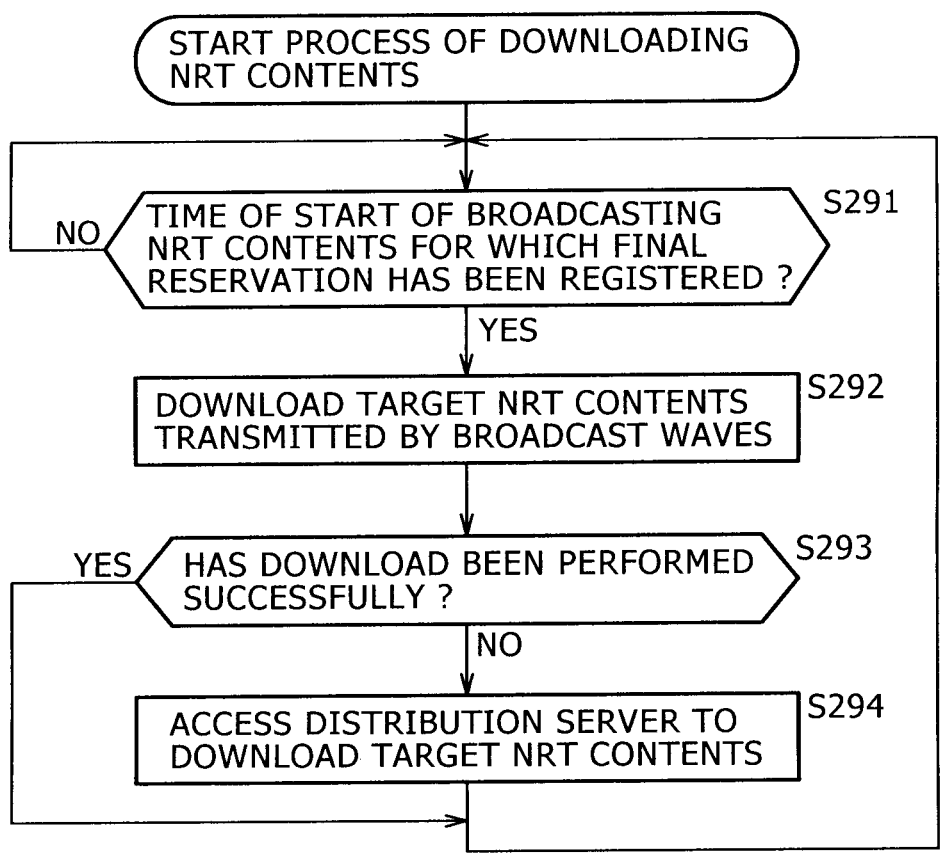
FIG. 26 is a flowchart of assistance in explaining an NRT contents downloading process.

In addition, the download process of FIG. 26 is realized by the execution of a so-called resident application by the control section 221.

That concludes the description of the NRT content download process.

(Process of Distributing NDO Application)

Figure 27:
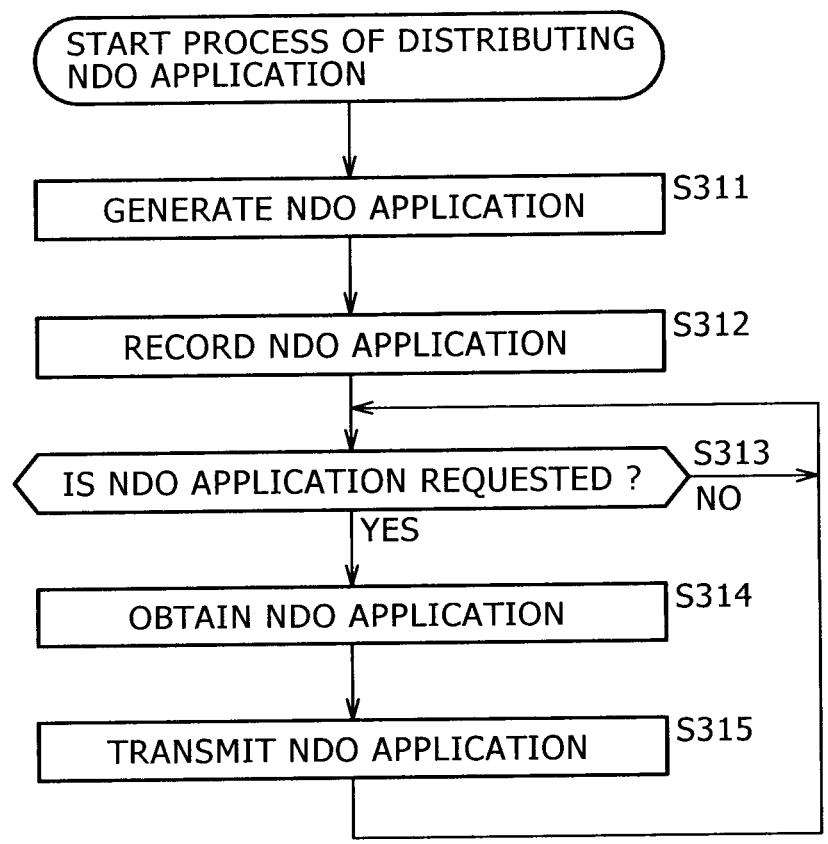
FIG. 27 is a flowchart of assistance in explaining an NDO application distributing process.

A process of distributing the NDO application which process is executed by the application server 40 will next be described with reference to a flowchart of FIG. 27.

In step S311, the application generating section 412 generates the NDO application under control from the control section 411. In step S312, the application generating section 412 records the generated NDO application in the recording section 413 under control from the control section 411.

Specifically, the NDO application is created as an HTML document for data broadcasting which HTML document is composed of various kinds of text and material data or the like, and is further embedded with functions for executing processes related to NRT contents as scripts according to uses of the NDO application. That is, when the producer of the NDO application desires to embed a process related to NRT contents, the producer of the NDO application can realize the function of the process by using a function defined as a common control system.

In step S313, the control section 411 determines whether the NDO application is requested by the receiving device 20 by monitoring the communication I/F 414. After waiting for a request from the receiving device 20 in step S313, the process is advanced to step S314.

In step S314, the control section 411 obtains the NDO application corresponding to the request from the receiving device 20 from the recording section 413. In step S315, the control section 411 controls the communication I/F 414 to transmit the obtained NDO application to the receiving device 20.

After the transmitting process of step S315 is ended, the process returns to step S313 to repeat the process from step S313 on down.

That concludes the description of the NDO application distributing process.

As described above, the present technology can provide a common control system for controlling NRT contents by defining the functions of FIGS. 10 to 18.

<Examples of Modification>

Incidentally, the above description has been made supposing that the functions of FIGS. 10 to 18 are described as a script in the NDO application (HTML document for data broadcasting). However, similar functions can be provided also when the functions of FIGS. 10 to 18 are described as a script in an HTML document for data broadcasting such as the TDO application, the PDO application, or the like.

In addition, the above description has been made by taking JavaScript (registered trademark) as an example of a script language. However, another script language or a computer language may be used. Further, the above description has been made supposing that the TDO, the NDO, and the PDO are composed of an HTML document. However, the TDO, the NDO, and the PDO may be composed of a description document described in another computer language.

In addition, the above description has been made centering on an example in which the TDO application, the NDO application, and the PDO application are provided from the application servers via the Internet 90. However, the TDO application, the NDO application, and the PDO application may be transmitted by broadcast waves using a FLUTE session. In addition, broadcast contents transmitted from the transmitting device 10 by the normal broadcast may be distributed as communication contents via the Internet from a distribution server (not shown) connected to the Internet 90. Incidentally, in the above description, the "DO" of the TDO, the NDO, and the PDO is described as an abbreviation for "Declarative Object." However, the "DO" of the TDO, the NDO, and the PDO may also be an abbreviation for "Downloadable Object."

Further, the above description has been made supposing that the receiving device 20 is a television receiver. However, the receiving device 20 is not limited to this. For example, the receiving device 20 may be configured without a display or a speaker so that the functions thereof are incorporated into an electronic device such as a video recorder or the like.

<Description of Computer to which Present Technology is Applied>

The series of processes described above can be carried out not only by hardware but also by software. When the series of processes is to be carried out by software, a program constituting the software is installed onto a computer. The computer includes a computer incorporated in dedicated hardware, for example a general-purpose personal computer that can perform various kinds of functions by installing various kinds of programs thereon, and the like.

Figure 28:
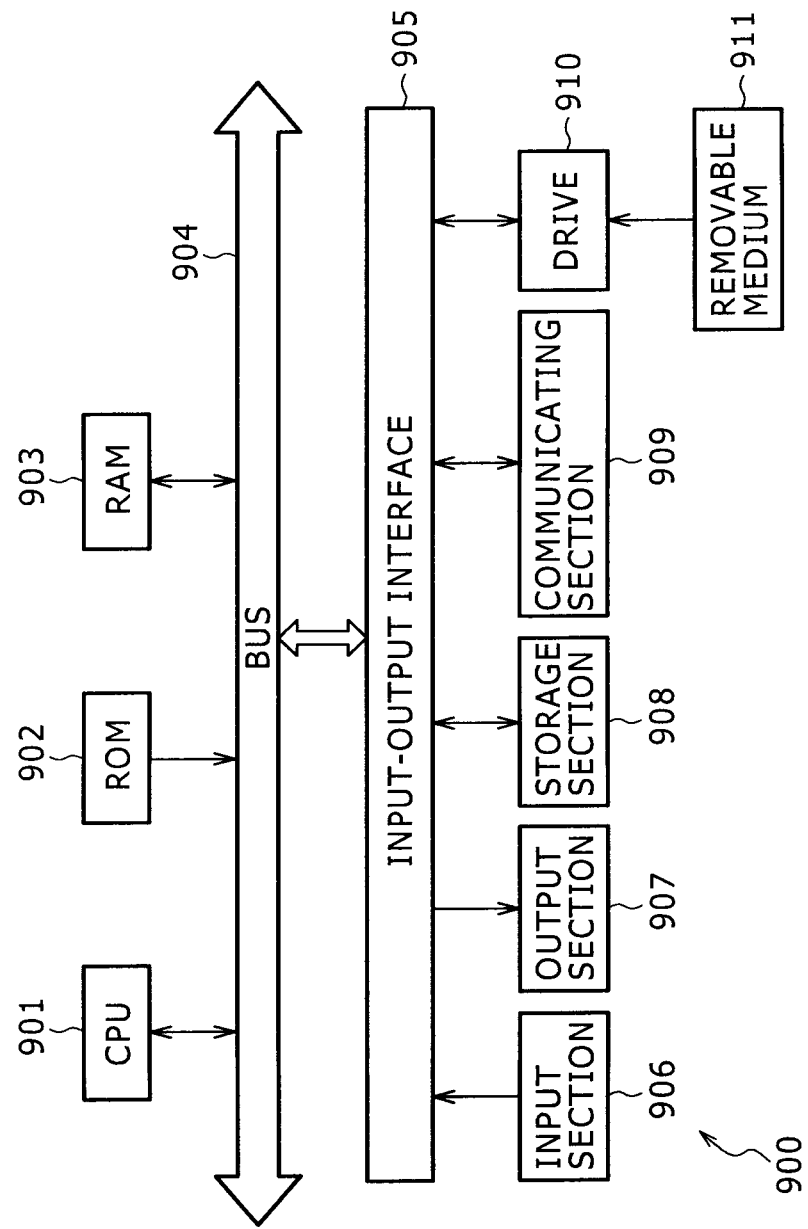
FIG. 28 is a diagram showing an example of configuration of a computer.

FIG. 28 is a block diagram showing an example of hardware configuration of a computer executing the series of processes described above by a program.

In the computer 900, a CPU (Central Processing Unit) 901, a ROM (Read Only Memory) 902, and a RAM (Random Access Memory) 903 are interconnected by a bus 904.

The bus 904 is further connected with an input-output interface 905. The input-output interface 905 is connected with an input section 906, an output section 907, a storage section 908, a communicating section 909, and a drive 910.

The input section 906 includes a keyboard, a mouse, a microphone, and the like. The output section 907 includes a display, a speaker, and the like. The storage section 908 includes a hard disk, a nonvolatile memory, and the like. The communicating section 909 includes a network interface and the like. The drive 910 drives a removable medium 911 such as a magnetic disk, an optical disk, a magneto-optical disk, a semiconductor memory, or the like.

In the computer 900 configured as described above, the CPU 901 for example loads a program stored in the storage section 908 into the RAM 903 via the input-output interface 905 and the bus 904, and then executes the program. Thereby the series of processes described above is executed.

The program executed by the computer 900 (CPU 901) can be for example provided in a state of being recorded on the removable medium 911 as a packaged medium or the like. In addition, the program can be provided via a wired or wireless transmission medium such as a local area network, the Internet, digital satellite broadcasting, or the like.

In the computer 900, the program can be installed into the storage section 908 via the input-output interface 905 by loading the removable medium 911 into the drive 910. In addition, the program can be received by the communicating section 909 via a wired or wireless transmission medium and installed into the storage section 908. Further, the program can be installed in the ROM 902 or the storage section 908 in advance.

Incidentally, the program executed by the computer 900 may be a program for executing the processes in time series in the order described in the present specification, or may be a program for executing the processes in parallel or in necessary timing such as at a time of a call being made, for example.

In the present specification, the process steps describing the program for making the computer 900 execute the various kinds of processes do not necessarily need to be processed in time series in the order described in the flowcharts, but include processes executed in parallel or individually (for example parallel processing or processing according to an object).

In addition, the program may be processed by one computer, or may be processed by distributed processing by a plurality of computers. Further, the program may be transferred to a remote computer and executed by the remote computer.

Further, in the present specification, a system refers to a set of a plurality of constituent elements (devices, modules (parts), and the like), regardless of whether or not all the constituent elements are present in a same casing. Thus, a plurality of devices housed in separate casings and connected to each other via a network and one device formed by housing a plurality of modules in one casing are each a system.

It is to be noted that embodiments of the present technology are not limited to the foregoing embodiments, and that various changes can be made without departing from the spirit of the present technology.

For example, the present technology can adopt a configuration of cloud computing in which one function is shared and handled jointly by a plurality of devices via a network.

In addition, each of the steps described in the foregoing flowcharts can be not only performed by one device but also shared and performed by a plurality of devices.

Further, when one step includes a plurality of processes, the plurality of processes included in the one step can be not only executed by one device but also shared and executed by a plurality of devices.

Incidentally, the present technology can adopt the following constitutions.

(1) A receiving device including:
a first receiving section configured to receive AV contents capable of a download reservation and transmitted in non-real time;
a recording section configured to record the AV contents that have been downloaded;
an obtaining section configured to obtain an application program for executing a process related to the AV contents; and
an executing section configured to execute the process related to the AV contents on a basis of control information included in the application program.

(2) The receiving device according to (1),
wherein when a predetermined event has occurred during execution of the application program, the executing section executes the process related to the AV contents according to the event that has occurred.

(3) The receiving device according to (2),
wherein the control information is a function for reserving a download of the AV contents, and
when the AV contents whose download is to be reserved are specified, the executing section reserves a download of the specified AV contents.

(4) The receiving device according to (3),
wherein the control information is a function for cancelling a reservation for a download of the AV contents, and
when the AV contents to be cancelled are specified, the executing section cancels the reservation for a download of the specified AV contents.

(5) The receiving device according to (2) or (3),
wherein the control information is a function for obtaining a download state of the AV contents whose download is reserved, and
when an instruction to obtain the download state is given, the executing section obtains the download state.

(6) The receiving device according to any one of (2) to (5),
wherein the control information is a function for obtaining detailed information on the downloaded AV contents, and
when an instruction to obtain the detailed information is given, the executing section obtains the detailed information.

(7) The receiving device according to any one of (2) to (6),
wherein the control information is a function for performing an immediate download of the AV contents, and
when the immediate download of the AV contents whose download is to be reserved is specified, the executing section performs the specified immediate download of the AV contents.

(8) The receiving device according to any one of (2) to (7),
wherein the control information is a function for stopping a download of the AV contents, and
when an instruction to stop the download of the AV contents is given, the executing section stops the download of the AV contents.

(9) The receiving device according to any one of (2) to (8),
wherein the control information is a function for deleting the downloaded AV contents and related information related to the AV contents, and when the AV contents to be deleted are specified, the executing section deletes the specified AV contents and the related information.

(10) The receiving device according to any one of (2) to (9),
wherein the control information is a function for updating download information on a download of the AV contents, the download information being transmitted periodically together with the AV contents, and when an instruction to update the download information is given, the executing section obtains and updates the download information.

(11) The receiving device according to any one of (2) to (10),
wherein the control information is a function for obtaining recording space information on a recording space of the recording section, and when an instruction to obtain the recording space information is given, the executing section obtains the recording space information.

(12) The receiving device according to any one of (1) to (11),
wherein the application program is an HTML document described in HTML (Hyper Text Markup Language), and the control information is a function described as a script in the HTML document.

(13) The receiving device according to (12),
wherein the obtaining section obtains the HTML document transmitted from an information processing device managed by another entity than an entity providing the AV contents.

(14) The receiving device according to (1),
wherein the first receiving section receives the AV contents transmitted by broadcast waves.

(15) The receiving device according to (14), further including a second receiving section configured to receive the AV contents distributed via the Internet when the AV contents transmitted by the broadcast waves cannot be received.

(16) The receiving device according to (2),
wherein the executing section identifies the target AV contents by identifying information identifying the AV contents, the identifying information being included in download information on a download of the AV contents, the download information being transmitted periodically together with the AV contents.

(17) The receiving device according to (16),
wherein the download information is an NRT-IT (Non Real Time Information Table), and the identifying information is a Content Linkage included in the NRT-IT.

(18) A receiving method of a receiving device, the receiving method including the steps of:

in the receiving device, receiving AV contents capable of a download reservation and transmitted in non-real time;

controlling recording of the AV contents that have been downloaded in a recording section;

obtaining an application program for executing a process related to the AV contents; and executing the process related to the AV contents on a basis of control information included in the application program.

(19) A transmitting device including:

a generating section configured to generate an application program including control information for executing a process related to AV contents capable of a download reservation and transmitted in non-real time; and a transmitting section configured to transmit the application program.

(20) A transmitting method of a transmitting device, the transmitting method including the steps of:

in the transmitting device, generating an application program including control information for executing a process related to AV contents capable of a download reservation and transmitted in non-real time; and transmitting the application program.

It should be understood by those skilled in the art that various modifications, combinations, sub-combinations and alternations may occur depending on design requirements and other factors insofar as they are within the scope of the appended claims or the equivalent thereof.

What is claimed is:

1. A receiving device comprising:
circuitry configured to
download, from a server managed by an entity other than an entity providing non-real-time audio visual contents, an application program related to the non-real-time audio visual contents,
execute the application program, including executing a function of reserving a download of the non-real-time audio visual contents from a broadcast signal,
receive the broadcast signal, the broadcast signal including real-time audio visual content and the non-real-time audio visual contents, the non-real-time audio visual contents having been reserved via a download reservation function of the application program and transmitted in non-real time,
record the non-real-time audio visual contents that have been downloaded.

2. The receiving device according to claim 1, wherein when a predetermined event has occurred during execution of the application program, the circuitry executes a process related to the non-real-time audio visual contents according to the event that has occurred.

3. The receiving device according to claim 2, wherein
when the non-real-time audio visual contents whose download is to be reserved are specified via the application program, the circuitry reserves a download of the specified non-real-time audio visual contents.

4. The receiving device according to claim 3, wherein
executing the application program includes performing a function for cancelling a reservation for a download of the non-real-time audio visual contents, and
when the non-real-time audio visual contents to be cancelled are specified via the application program, the circuitry cancels the reservation for a download of the specified non-real-time audio visual contents.

5. The receiving device according to claim 2, wherein
executing the application program includes performing a function for obtaining a download state of the non-real-time audio visual contents whose download is reserved, and
when an instruction to obtain the download state is given via the application program, the circuitry obtains the download state.

6. The receiving device according to claim 2, wherein
executing the application program includes performing a function for obtaining detailed information on the downloaded non-real-time audio visual contents, and when an instruction to obtain the detailed information is given via the application program, the circuitry obtains the detailed information.

7. The receiving device according to claim 2, wherein executing the application program includes performing a function for performing an immediate download of the non-real-time audio visual contents, and
when the immediate download of the non-real-time audio visual contents whose download is to be reserved is instructed via the application program, the circuitry performs the instructed immediate download of the non-real-time audio visual contents.

8. The receiving device according to claim 7, wherein executing the application program includes performing a function for stopping a download of the non-real-time audio visual contents, and
when an instruction to stop the download of the non-real-time audio visual contents is given via the application program, the circuitry stops the download of the non-real-time audio visual contents.

9. The receiving device according to claim 2, wherein executing the application program includes performing a function for deleting the downloaded non-real-time audio visual contents and related information related to the non-real-time audio visual contents, and
when the non-real-time audio visual contents to be deleted are specified via the application program, the circuitry deletes the specified non-real-time audio visual contents and the related information.

10. The receiving device according to claim 2, wherein executing the application program includes performing a function for updating download information on a download of the non-real-time audio visual contents, the download information being transmitted periodically together with the non-real-time audio visual contents, and
when an instruction to update the download information is given via the application program, the circuitry obtains and updates the download information.

11. The receiving device according to claim 2, wherein executing the application program includes performing a function for obtaining recording space information on a recording space of a memory to which the non-real-time audio visual contents that have been downloaded are recorded, and
when an instruction to obtain the recording space information is given via the application program, the circuitry obtains the recording space information.

12. The receiving device according to claim 1, wherein the application program is a Hyper Text Markup Language document described in Hyper Text Markup Language, and including functions described as scripts in the HTML document.

13. The receiving device according to claim 12, wherein the circuitry obtains the Hyper Text Markup Language document transmitted from an information processing device managed by another entity than an entity providing the audio visual contents.

14. The receiving device according to claim 1, wherein the circuitry receives the non-real-time audio visual contents transmitted by broadcast waves.

15. The receiving device according to claim 14, wherein the circuitry is further configured to receive the non-real-time audio visual contents distributed via the Internet when the non-real-time audio visual contents transmitted by the broadcast waves cannot be received.

16. The receiving device according to claim 2, wherein the circuitry identifies target non-real-time audio visual contents by identifying information identifying the non-real-time audio visual contents, the identifying information being included in download information on a download of the non-real-time audio visual contents, the download information being transmitted periodically together with the non-real-time audio visual contents.

17. The receiving device according to claim 16, wherein the download information is an Non Real Time Information Table, and
the identifying information is a Content Linkage included in the Non Real Time Information Table.

18. The receiving device according to claim 1, wherein the circuitry is configured to obtain the application program based on whether a type of service to be processed by the receiving device is provided in real-time.

19. A receiving method of a receiving device, the receiving method comprising:
in the receiving device,
downloading, from a server managed by an entity other than an entity providing non-real-time audio visual contents, an application program related to the non-real-time audio visual contents;
executing the application program, including executing a function of reserving a download of the non-real-time audio visual contents from a broadcast signal;
receiving the broadcast signal, the broadcast signal including real-time audio visual content and the non-real-time audio visual contents having been reserved via a download reservation function of the application program and transmitted in non-real time;
controlling recording of the non-real-time audio visual contents that have been downloaded in a memory.

20. A transmitting device comprising:
circuitry configured to
generate an application program related to non-real-time audio visual contents, the application program having a function of reserving download of the non-real-time audio visual contents via a download reservation function of the application program, the reserved non-real-time audio visual contents being transmitted in non-real time in a broadcast signal that includes the non-real-time audio visual contents and real-time audio visual content; and
transmit the application program, wherein
the transmitting device is managed by an entity other than an entity providing the non-real-time audio visual contents.

21. A transmitting method of a transmitting device, the transmitting method comprising:
in the transmitting device,
generating, by circuitry of the transmitting device, an application program related to non-real-time audio visual contents, the application program having a function of reserving download of the non-real-time audio visual contents via a download reservation function of the application program, the reserved non-real-time audio visual contents being transmitted in non-real time in a broadcast signal that includes the non-real-time audio visual contents and real-time audio visual content; and
transmitting the application program, wherein
the transmitting device is managed by an entity other than an entity providing the non-real-time audio visual contents.

* * * * *